United States Patent
Kobayashi et al.

(10) Patent No.: US 7,864,485 B2
(45) Date of Patent: Jan. 4, 2011

(54) MAGNETIC RECORDING MEDIUM, RECORDING AND REPRODUCING DEVICE, MAGNETIC RECORDING MEDIUM-MAGNETIZING METHOD, AND MAGNETIC RECORDING MEDIUM-MAGNETIZING DEVICE

(75) Inventors: Tatsuhiro Kobayashi, Tokyo (JP); Makoto Moriya, Tokyo (JP)

(73) Assignee: TDK Corporation, Tokyo (JP)

( * ) Notice: Subject to any disclaimer, the term of this patent is extended or adjusted under 35 U.S.C. 154(b) by 397 days.

(21) Appl. No.: 11/965,091

(22) Filed: Dec. 27, 2007

(65) Prior Publication Data

US 2008/0158718 A1 Jul. 3, 2008

(30) Foreign Application Priority Data

Dec. 28, 2006 (JP) ............................. 2006-353625

(51) Int. Cl.
 *G11B 5/596* (2006.01)
(52) U.S. Cl. ................................. 360/77.08
(58) Field of Classification Search ................. 360/48, 360/66, 55, 39, 77.08
 See application file for complete search history.

(56) References Cited

U.S. PATENT DOCUMENTS

| 4,220,084 A | * | 9/1980 | Maclean et al. ............. 101/235 |
| 5,138,511 A | | 8/1992 | Hoshimi et al. |
| 5,889,629 A | * | 3/1999 | Patton, III ..................... 360/75 |
| 6,127,825 A | * | 10/2000 | Goto .......................... 324/307 |
| 6,218,834 B1 | * | 4/2001 | Goto .......................... 324/307 |
| 6,999,257 B2 | * | 2/2006 | Takeo .......................... 360/48 |
| 7,012,774 B2 | * | 3/2006 | Nakao et al. .................. 360/48 |
| 7,345,844 B2 | * | 3/2008 | Toffle et al. .............. 360/97.02 |
| 2007/0009655 A1 | | 1/2007 | Yamazaki et al. |
| 2007/0026264 A1 | | 2/2007 | Kuwajima et al. |
| 2007/0115586 A1 | | 5/2007 | Takai et al. |
| 2007/0139804 A1 | | 6/2007 | Ito et al. |
| 2007/0153409 A1 | | 7/2007 | Soeno |

FOREIGN PATENT DOCUMENTS

| JP | 2-252119 | 10/1990 |
| JP | 7-129953 | 5/1995 |
| JP | 2002-230734 A | 8/2002 |

OTHER PUBLICATIONS

English language Abstract of JP 7-129953.
English language Abstract of JP 2-252119.
English language computer-generated translation of JP 7-129953 A, May 19, 1995.
English language Abstract of JP 2002-230734 A, Aug. 16, 2002.

* cited by examiner

*Primary Examiner*—Fred Tzeng
(74) *Attorney, Agent, or Firm*—Greenblum & Bernstein, P.L.C.

(57) ABSTRACT

A magnetic recording medium enhances the quality of a reproducing signal. The magnetic recording medium has a servo pattern formed in a servo pattern area on at least one surface of a disk-shaped substrate by a concave/convex pattern having convex portions (recording areas) and concave portions (non-recording areas), and a data track pattern formed by the concave/convex pattern in a data recording area on the at least one surface of the disk-shaped substrate. In a state where recording data is not recorded in the data recording area, the convex portions in the servo pattern area are DC-magnetized, and the convex portions in the data recording area are AC-magnetized.

15 Claims, 8 Drawing Sheets

MAGNETIC RECORDING MEDIUM, RECORDING AND REPRODUCING DEVICE, MAGNETIC RECORDING MEDIUM-MAGNETIZING METHOD, AND MAGNETIC RECORDING MEDIUM-MAGNETIZING DEVICE

BACKGROUND OF THE INVENTION

1. Field of the Invention

The present invention relates to a magnetic recording medium that has a servo pattern and a data track pattern respectively formed in a servo pattern area and a data recording area on at least one surface of a disk-shaped substrate by a pattern having a recording area and a non-recording area, a recording and reproducing device provided with the magnetic recording medium, and a magnetic recording medium-magnetizing method and a magnetic recording medium-magnetizing device for magnetizing the magnetic recording medium.

2. Description of the Related Art

As a magnetic recording medium of this kind, Japanese Laid-Open Patent Publication (Kokai) No. H07-129953 discloses a magnetic layer etching-type perpendicular magnetic recording disk (discrete track-type magnetic recording medium: hereinafter also referred to as "the magnetic disk") in which part of data track portions and part of servo signal portions are separately magnetically formed with concave/convex portions by lithography and the like. To manufacture the magnetic disk, first, a back lining layer, a magnetic recording layer, and a protective layer are sequentially formed on a substrate in the mentioned order, and then a photoresist is applied onto the protective layer. Next, an exposure process and a development process (patterning) are carried out on the photoresist layer to thereby form a mask for etching. Then, anisotropic etching by an ion milling method, for example, is executed, whereby the protective layer, the magnetic recording layer and the back lining layer are etched at portions exposed from the mask.

Next, the photoresist is removed by executing oxygen plasma process and acetone cleaning. This forms a concave/convex pattern on the substrate, whereby the magnetic disk is made. After that, for example, the whole area of the magnetic disk is DC-magnetized using e.g., an electromagnet, whereby convex portions of the magnetic layer (hereinafter referred to as "the convex portions") of both the servo signal portions and the data track portions are magnetized, whereby a servo signal (servo pattern) is recorded on the servo signal portions by the magnetic signal (magnetic pattern). This completes the magnetic disk.

SUMMARY OF THE INVENTION

From the study of the above-described magnetic disk, however, the present inventors found the following problems. The conventional magnetic disk is configured such that the servo pattern can be magnetically read by forming a concave/convex pattern corresponding to the servo pattern on the servo signal portions (servo pattern area), and DC-magnetizing the convex portions of the concave/convex pattern in the whole area of the magnetic disk. In this case, in the conventional magnetic disk, not only the servo pattern area but also the convex portions (discrete tracks: data recording tracks) of the data track portions (data recording area) are DC-magnetized. Therefore, when recording the recording data on the conventional magnetic disk, the DC-magnetized data recording tracks are AC-magnetized, whereby a magnetic signal corresponding to the recording data is recorded on the data recording tracks (hereinafter "recording of a magnetic signal corresponding to recording data" is also referred to as "recording of recording data").

For this reason, in the conventional magnetic disk, in each data recording track having recording data recorded thereon, areas DC-magnetized before recording of the recording data (during manufacturing the magnetic disk) exist at locations upstream and downstream of the portions for recording of recording data in the direction of rotation of the magnetic disk. This means that when reading a magnetic signal corresponding to the recording data from the data recording track during reproducing of the recording data, the magnetic signal read from the upstream end and the downstream end (i.e., a start position at which recording of the recording data on the data recording track is started and an end position at which the recording is ended) of the portions having the recording data recorded thereon is in a state in which DC-magnetic components are superimposed on AC-magnetic components corresponding to the recording data. Therefore, the conventional magnetic disk suffers from the problem that the quality of a reproducing signal outputted from the magnetic head during reproducing of the recording data is degraded by the DC-magnetization of the data recording track for recording the recording data, so that there is a risk that this makes it difficult to normally reproduce the recording data.

Further, in the conventional magnetic disk, in a state in which recording data is recorded on a predetermined data recording track, data recording tracks adjacent to the predetermined data recording track are in a DC-magnetized state. Therefore, when reading a magnetic signal corresponding to the recording data from the predetermined data recording track during reproducing of the recording data, the magnetic signal is read in a state in which DC-magnetic components existing in the adjacent data recording tracks are superimposed on the magnetic signal (AC-magnetic component) recorded on the data recording track. As a result, the conventional magnetic disk suffers from the problem that the quality of the reproducing signal outputted from the magnetic head during reproducing of recording data is degraded due to the DC-magnetization of the data recording tracks adjacent to the data recording track having the recording data recorded thereon, so that there is a risk that this makes it difficult to normally reproduce the recording data.

The present invention has been made in view of these problems, and a main object of the present invention is to provide a magnetic recording medium, a recording and reproducing device, a magnetic recording medium-magnetizing method, and a magnetic recording medium-magnetizing device, which are capable of enhancing the quality of a reproducing signal.

To attain the above main object, the present invention provides a rotary-type magnetic recording medium that has a servo pattern formed in a servo pattern area on at least one surface of a disk-shaped substrate by a pattern having a recording area and a non-recording area, and a data track pattern formed in a data recording area on the at least one surface of the disk-shaped substrate by the pattern, wherein in a state in which recording data is not recorded in the data recording area, the recording area in the servo pattern area is DC-magnetized, while the recording area in the data recording area is AC-magnetized.

In addition, a rotary-type magnetic recording medium according to the present invention has a servo pattern formed in a servo pattern area on at least one surface of a disk-shaped substrate by a pattern having a recording area and a non-recording area, and a data track pattern formed in a data recording area on the at least one surface of the disk-shaped substrate by the pattern, wherein in a state in which the magnetic recording medium is not mounted in a recording and reproducing device, the recording area in the servo pattern area is DC-magnetized, while the recording area in the data recording area is AC-magnetized.

In addition, a rotary-type magnetic recording medium according to the present invention has a servo pattern formed in a servo pattern area on at least one surface of a disk-shaped substrate by a pattern having a recording area and a non-recording area, and a data track pattern formed in a data recording area on the at least one surface of the disk-shaped substrate by the pattern, wherein the recording area in the servo pattern area is DC-magnetized, while the recording area in the data recording area is AC-magnetized, and at the same time an inversion period of a magnetization direction in a direction of rotation of the magnetic recording medium is fixed in a whole AC-magnetized area in the data recording area.

In addition, a rotary-type magnetic recording medium according to the present invention has a servo pattern formed in a servo pattern area on at least one surface of a disk-shaped substrate by a pattern having a recording area and a non-recording area, and a data track pattern formed in a data recording area on the at least one surface of the disk-shaped substrate by the pattern, wherein the recording area in the servo pattern area is DC-magnetized, while the recording area in the data recording area is AC-magnetized, and at the same time an inversion period of a magnetization direction in a direction of rotation of the magnetic recording medium in an AC-magnetized area in the data recording area is different from an inversion period of a magnetization direction in which the recording area is AC-magnetized during recording of recording data in the data recording area.

According to these magnetic recording media, unlike the conventional magnetic disk in which convex portions (recording areas) in both the servo pattern area and the data recording area (all the areas in the magnetic disk) are DC-magnetized, the recording area (data recording track) in the data recording area is AC-magnetized prior to recording of recording data. Therefore, during reproducing of recording data, a magnetic signal in a state in which DC-magnetic components are superimposed on AC-magnetic components applied when recording the recording data is not read, but only the AC-magnetic components applied when recording the recording data can be read, thereby making it possible to sufficiently enhance the quality of a reproducing signal.

It should be noted that throughout the present specification, the term "the recording area in the data recording area is AC-magnetized" is intended to include not only a state in which "the whole of the data recording area is AC-magnetized" but also a state in which "part of the data recording area is AC-magnetized". Further, throughout the present specification, the term "recording area" is intended to mean an "area configured to readably hold a recorded magnetic signal" (i.e., an area configured to have the capability of readably holding a recorded magnetic signal". Further, throughout the present specification, the term "non-recording area" is intended to mean an "area configured such that the capability of readably holding a recorded magnetic signal becomes lower than that of the recording area" or an "area configured not to have the capability". More specifically, throughout the present specification, the term "non-recording area" is intended to mean an "area generating a smaller magnetic field than a magnetic field generated by the above-described recording area, or an area generating no substantial magnetic field". Furthermore, throughout the present specification, the term "DC-magnetized" is intended to mean a state in which the recording area is magnetized such that the magnetization direction is fixed. Further, throughout the present specification, the term "AC-magnetized" is intended to mean a state in which the recording area is magnetized such that the magnetization direction is inverted at a predetermined period in the direction of rotation of the magnetic recording medium.

Further, throughout the present specification, the term "inversion period of the magnetization direction" is intended to mean a period, i.e., a period that corresponds to twice the following time period; a time period for the magnetic head to pass above an area magnetized in one direction by the AC-magnetization, or a time period for the magnetic head to pass above an area magnetized in the other direction by the AC-magnetization. Therefore, in the magnetic recording medium which is rotated during recording and reproducing of recording data under the condition of a constant angular velocity, the state in which "the inversion period of the magnetization direction is fixed in the whole AC-magnetized area" means a state in which the time period over which the magnetic head passes above an area magnetized in one direction by the AC-magnetization, or the time period over which the magnetic head passes above an area magnetized in the other direction by the AC-magnetization is the same in the whole AC-magnetized area. Further, in the magnetic recording medium which is rotated during recording and reproducing of recording data under the condition of the constant linear velocity, the state in which "the inversion period of the magnetization direction is fixed in the whole AC-magnetized area" means a state in which the length of the area magnetized in one direction by the AC-magnetization in the direction of rotation of the magnetic recording medium, or the length of the area magnetized in the other direction by the AC-magnetization in the direction of rotation of the magnetic recording medium is the same in the whole AC-magnetized area.

In a magnetic recording medium according to the present invention, the recording area may be AC-magnetized except for an end area thereof toward the servo pattern area in the direction of rotation of the magnetic recording medium. According to this magnetic recording medium, it is possible to reliably read servo patterns (servo signals) from the whole servo pattern area without making it difficult to read the servo patterns due to the AC-magnetization of the end of the servo pattern area toward the data recording area.

In addition, the present invention provides a recording and reproducing device comprising any of the magnetic recording media described above, a magnetic head for recording a magnetic signal on the magnetic recording medium and reading the magnetic signal from the magnetic recording medium, and a control section for controlling recording and reading of the magnetic signal by the magnetic head. According to this recording and reproducing device, the quality of a reproducing signal for use in reading recording data from the magnetic recording medium is sufficiently enhanced, whereby it is possible to read the recording data with high accuracy.

In addition, the present invention provides a recording and reproducing device comprising a rotary-type magnetic recording medium that has a servo pattern formed in a servo pattern area on at least one surface of a disk-shaped substrate by a pattern having a recording area and a non-recording area, and a data track pattern formed in a data recording area on the at least one surface of the disk-shaped substrate by the pattern, wherein the recording area in the servo pattern area on the at least one surface of the disk-shaped substrate is DC-magnetized, a magnetic head for recording a magnetic signal on the magnetic recording medium and reading the magnetic signal from the magnetic recording medium, and a control section for controlling recording and reading of the magnetic signal by the magnetic head, wherein the control section carries out either one of an AC-magnetization process for AC-magnetizing the recording area in the data recording area via the magnetic head at a predetermined time point before recording of recording data in the data recording area, and an AC-magnetization process for AC-magnetizing, via the magnetic head, a predetermined data recording track formed by the recording area in the data recording area within a processing range which is defined for the data recording track in advance, before recording the recording data on the predetermined data recording track.

According to the recording and reproducing device in which the control section carries out the AC-magnetization process for AC-magnetizing the recording area in the data recording area at the predetermined time point before recording of recording data in the data recording area, unlike the recording and reproducing device configured to record recording data on a DC-magnetized data recording track, it is possible to read only AC-magnetic components applied when recording the recording data during reproducing of the recording data without reading a magnetic signal in a state in which DC-magnetic components are superimposed on the AC-magnetic components, thereby making it possible to sufficiently enhance the quality of a reproducing signal. As a result, according to the recording and reproducing device, it is possible to read recording data with high accuracy.

Further, according to the recording and reproducing device in which the control section performs the AC-magnetization process for AC-magnetizing the data recording track within the processing range defined in advance for the data recording track on which recording data is recorded, before recording of the recording data on the predetermined data recording track formed by the recording area in the data recording area, unlike the recording and reproducing device configured to record recording data on a DC-magnetized data recording track, it is possible to read only AC-magnetic components applied when recording the recording data, during reproducing of the recording data without reading magnetic signals in a state in which DC-magnetic components are superimposed on the AC-magnetic components, thereby making it possible to sufficiently enhance the quality of a reproducing signal. As a result, according to the recording and reproducing device, it is possible to read recording data with high accuracy. Further, unlike the recording and reproducing device configured to AC-magnetize e.g., all the data recording areas on the magnetic recording medium immediately before recording of recording data, it is possible to AC-magnetize only portions which can be affected by DC-magnetic components during reproducing of the recording data in a short time period, which makes it possible to start recording of the recording data on the magnetic recording medium in a short time.

In addition, in a recording and reproducing device according to the present invention, the control section may carry out the AC-magnetization process by setting a time point when an instruction command is outputted from an external device as the predetermined time point. With this recording and reproducing device, it is possible to cause the control section to reliably execute the AC-magnetization process in desired timing before a time point (time point of recording of recording data) when it is necessary for the data recording areas to have been AC-magnetized.

In addition, in a recording and reproducing device according to the present invention, the control section may cause the recording area to be AC-magnetized in the data recording area such that an inversion period of a magnetization direction in a direction of rotation of the magnetic recording medium is fixed in a whole area AC-magnetized by the AC-magnetization process. With this recording and reproducing device, compared with the construction in which the recording area in the data recording area is AC-magnetized such that the inversion period of the magnetization direction is made different depending on portions of the data recording track, it is possible to reliably average AC-magnetic components applied to the data recording track by the AC-magnetization process, and to reliably read only AC-magnetic components applied when recording the recording data, when the recording data is reproduced. As a result, according to the recording and reproducing device, it is possible to further enhance the quality of a reproducing signal.

In addition, in a recording and reproducing device according to the present invention, the control section may cause the recording area to be AC-magnetized in the data recording area such that an inversion period of a magnetization direction in a direction of rotation of the magnetic recording medium in the area AC-magnetized by the AC-magnetization process is made different from an inversion period of a magnetization direction in which the recording area is AC-magnetized during recording of the recording data. With this recording and reproducing device, unlike the recording and reproducing device which is configured to AC-magnetize the recording area in the data recording area during execution of the AC-magnetization process at the same inversion period as that of during the recording of recording data, it is possible to prevent AC-magnetic components applied by the AC-magnetization process from being erroneously read as part of the recording data recorded on the recording area.

In addition, in a recording and reproducing device according to the present invention, the control section may cause the recording area to be AC-magnetized in the data recording area except for an end area of the recording area toward the servo pattern area in the direction of rotation of the magnetic recording medium during execution of the AC-magnetization process. With this recording and reproducing device, it is possible to reliably read servo patterns (servo signals) from the whole servo pattern area without making it difficult to read the servo patterns due to the AC-magnetization of the end of the servo pattern area toward the data recording area.

In addition, the present invention provides a magnetic recording medium-magnetizing method for magnetizing a rotary-type magnetic recording medium that has a servo pattern formed in a servo pattern area on at least one surface of a disk-shaped substrate by a pattern having a recording area and a non-recording area, and a data track pattern formed in a data recording area on the at least one surface of the disk-shaped substrate by the pattern, wherein a first magnetization process for DC-magnetizing the recording area in the servo pattern area on the at least one surface of the disk-shaped substrate, and a second magnetization process for AC-magnetizing the recording area in the data recording area while rotating the magnetic recording medium are carried out in the mentioned order.

In addition, the present invention provides a magnetic recording medium-magnetizing device for magnetizing a rotary-type magnetic recording medium, the magnetic recording medium-magnetizing device comprising a rotating mechanism for rotating the rotary-type magnetic recording medium that has a servo pattern formed in a servo pattern area on at least one surface of a disk-shaped substrate by a pattern having a recording area and a non-recording area, and a data track pattern formed in a data recording area on the at least one surface of the disk-shaped substrate by the pattern, wherein the recording area in the servo pattern area on the at least one surface of the disk-shaped substrate is DC-magnetized, a magnetic head for magnetizing the recording area, a power supply section for supplying an AC voltage to the magnetic head, and a control section for controlling the rotating mechanism and the power supply section, wherein while controlling the rotating mechanism such that the magnetic recording medium is rotated, the control section controls and causes the power supply section to supply the AC voltage to the magnetic head when the magnetic head is positioned above the data recording area to thereby AC-magnetize the recording area in the data recording area.

In addition, the present invention provides a magnetic recording medium-magnetizing method for magnetizing a rotary-type magnetic recording medium that has a servo pattern formed in a servo pattern area on at least one surface of a disk-shaped substrate by a pattern having a recording area and a non-recording area, and a data track pattern formed in a data recording area on the at least one surface of the disk-shaped substrate by the pattern, wherein while the magnetic recording medium is being rotated, the recording area in the servo pattern area is DC-magnetized, and the recording area in the data recording area is AC-magnetized.

In addition, the present invention provides a magnetic recording medium-magnetizing device for magnetizing a rotary-type magnetic recording medium, the magnetic recording medium-magnetizing device comprising a rotating mechanism for rotating the rotary-type magnetic recording medium that has a servo pattern formed in a servo pattern area on at least one surface of a disk-shaped substrate by a pattern having a recording area and a non-recording area, and a data track pattern formed in a data recording area on the at least one surface of the disk-shaped substrate by the pattern, a magnetic head for magnetizing the recording area, a power supply section for supplying a DC voltage or an AC voltage to the magnetic head, and a control section for controlling the rotating mechanism and the power supply section, wherein while controlling the rotating mechanism such that the magnetic recording medium is rotated, the control section controls and causes the power supply section to supply the DC voltage to the magnetic head when the magnetic head is positioned above the servo pattern area to thereby DC-magnetize the recording area in the servo pattern area, and when the magnetic head is positioned above the data recording area, and the control section controls and causes the power supply section to supply the AC voltage to the magnetic head to thereby AC-magnetize the recording area in the data recording area.

According to these magnetic recording medium-magnetizing methods and these magnetic recording medium-magnetizing devices, the data recording track is AC-magnetized prior to recording of recording data on the magnetic recording medium, so that during reproducing of the recording data recorded on the magnetic recording medium, a magnetic signal in a state in which DC-magnetic components are superimposed on AC-magnetic components applied when recording the recording data are not read, but only the AC-magnetic components applied when recording the recording data can be read. This makes it possible to provide a magnetic recording medium having a sufficiently high quality of a reproducing signal.

It should be noted that the present disclosure relates to the subject matter included in Japanese Patent Application No. 2006-353625 filed Dec. 28, 2006, and all the disclosures therein are expressly incorporated herein by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Now, preferred embodiments of a magnetic recording medium, a recording and reproducing device, a magnetic recording medium-magnetizing method, and a magnetic recording medium-magnetizing device according to the present invention will be described with reference to the accompanying drawings.

First, a description will be given of the construction of a recording and reproducing device according to a first embodiment of the present invention with reference to figures.

Figure 1:
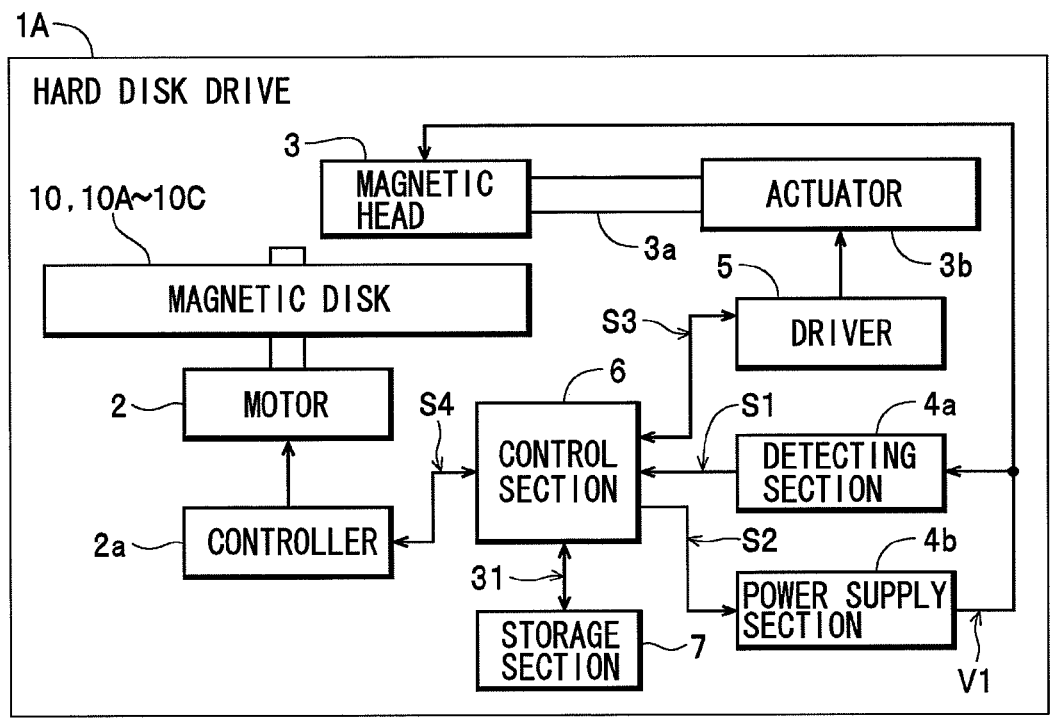
FIG. 1 is a schematic diagram of a hard disk drive as a recording and reproducing device according to a first embodiment of the present invention.
Figure 2:
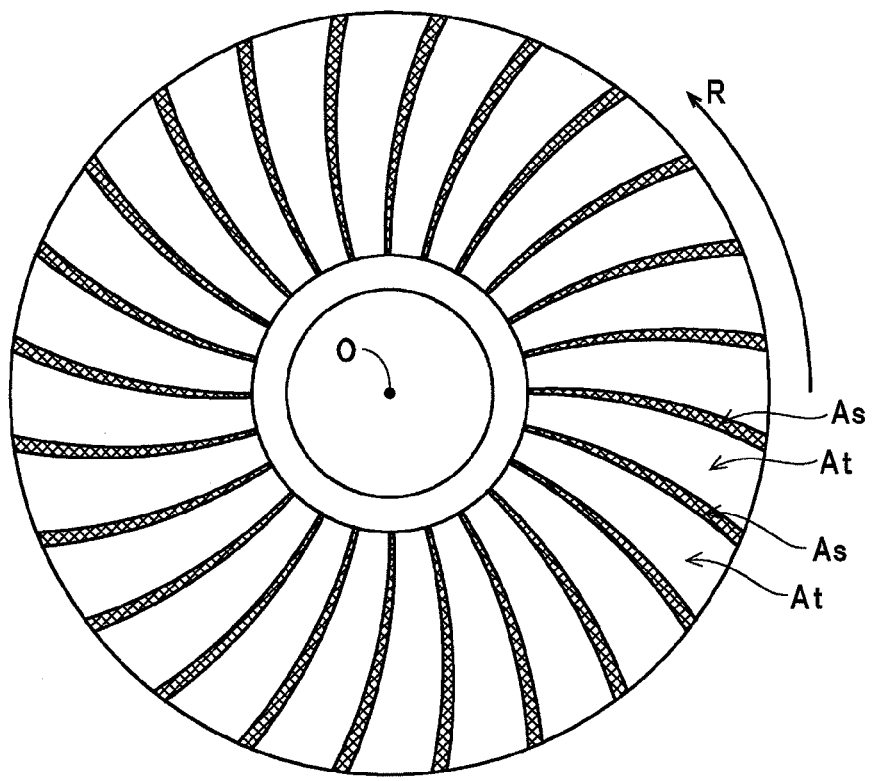
FIG. 2 is a plan view of a magnetic disk.

A hard disk drive 1A as the recording and reproducing device according to the first embodiment shown in FIG. 1 is an example of the recording and reproducing device according to the present invention, and is comprised of a motor 2, a controller 2a, a magnetic head 3, a detecting section 4a, a power supply section 4b, a driver 5, a control section 6, a storage section 7, and a magnetic disk 10, and is configured such that the hard disk drive 1A can record and reproduce various recording data. In this case, the magnetic disk 10 is a discrete track medium (patterned medium), which is an example of a magnetic recording medium according to the present invention. As shown in FIG. 2, the magnetic disk 10 is formed in a generally disk-like shape, and is attached to a rotational shaft of the motor 2. On the other hand, the motor 2 rotates the magnetic disk 10 e.g., at a fixed velocity of 7200 rpm with a constant angular velocity under the control of the controller 2a. Further, the controller 2a rotates the motor 2 according to a control signal S4 outputted from the control section 6.

The magnetic head 3 is attached to an actuator 3b via a swing arm 3a, and is moved above the magnetic disk 10 as the swing arm 3a is pivotally moved by the actuator 3b when recording data is recorded or reproduced on or from the magnetic disk 10. Further, the magnetic head 3 reads servo data from servo pattern areas As (see FIGS. 2 and 4) of the magnetic disk 10, magnetically writes recording data in data recording areas At (see FIGS. 2 and 4), and reads recording data magnetically written in the data recording areas At. It should be noted that actually, the magnetic head 3 has a recording element and a reproducing element formed on a bottom surface (air bearing surface) of a slider for flying the magnetic head 3 with respect to the magnetic disk 10, but detailed description and illustration of the slider, the recording element and the reproducing element are omitted. The actuator 3b causes the swing arm 3a to swing under the control of the control section 6 by drive current supplied from the driver 5, thereby moving the magnetic head 3 to a desired recording or reproducing position above the magnetic disk 10.

The detecting section 4a obtains (detects) servo data from an output signal (analog signal: servo signal) outputted from the magnetic head 3, generates a detection signal S1, and outputs the generated detection signal S1 to the control section 6. When recording data is recorded on the magnetic disk 10, the power supply section 4b supplies an AC voltage V1, the potential of which is inverted at a predetermined period, to the magnetic head 3 according to a control signal S2 outputted from the control section 6, to thereby AC-magnetize a data recording track of the magnetic disk 10. In this case, in the hard disk drive 1A, when recording data is recorded on the magnetic disk 10, the AC voltage V1, the potential of which is inverted at a predetermined period, is supplied to the magnetic head 3 from the power supply section 4b, as described above, whereby as shown in FIG. 5, the data recording track of the magnetic disk 10 is AC-magnetized by a magnetic field generated under the magnetic head 3 in a manner such that the direction of magnetization of a data recording track is inverted at a predetermined inversion period.

Figure 5:
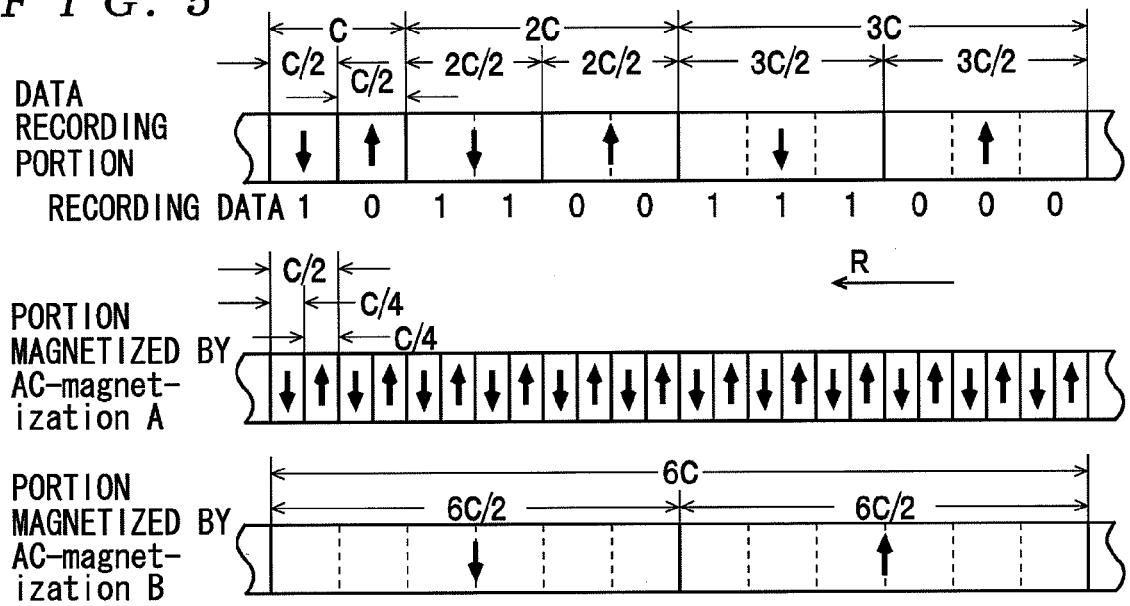
FIG. 5 is an explanatory view useful in explaining periods of AC-magnetization during recording of recording data and during execution of an AC-magnetization process.

It should be noted that each arrow in FIG. 5 indicates a direction in which the data recording track is magnetized by the AC-magnetization. In this case, as shown in FIG. 5, in a portion of the data recording track on which recording data is recorded (portion of the data recording track which is AC-magnetized in a manner associated with recording data), the length of an area magnetized in one direction (e.g., an area the magnetization direction of which is indicated by a downward arrow) in the direction of rotation of the magnetic disk 10 (a time period over which the magnetic head 3 passes above the area), and the length of an area magnetized in the other direction (e.g., an area the magnetization direction of which is indicated by an upward arrow) in the direction of rotation of the magnetic disk 10 (a time period over which the magnetic head 3 passes above the area) are made different depending on the contents of recording data. Therefore, in the data recording portion of recording data of magnetic recording medium of the above-mentioned kind, there exist plural kinds of "inversion periods of the magnetization direction" (there exist plural kinds of "recording frequencies of the recording signal"). It should be noted that although FIG. 5 shows a state in which there exist three kinds of inversion periods, such as a period C, a period 2C and a period 3C, by way of example, actually, there sometimes occurs a state in which two kinds or four or more kinds of inversion periods exist depending what kinds of coding technologies used when recording the recording data.

The driver 5 controls the actuator 3b according to a control signal S3 outputted from the control section 6, to thereby make the magnetic head 3 on-track to a desired data recording track. The control section 6 performs overall control of the hard disk drive 1A. Further, the control section 6, which is an example of the control section according to the present invention, controls the controller 2a, the power supply section 4b, and the driver 5 based on the detection signal (servo signal) S1 outputted from the detecting section 4a and a servo control program 31 stored in the storage section 7 (execution of a tracking servo control process and a recording and reproducing process of recording data). The storage section 7 stores the above-described servo control program 31, and so forth.

Figure 3:
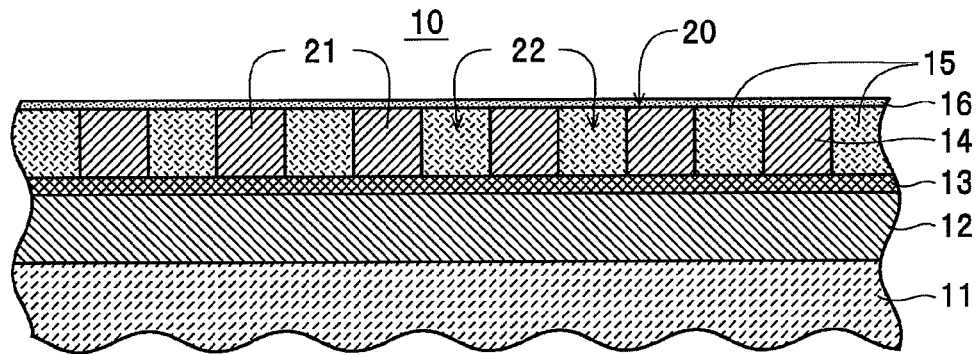
FIG. 3 is a cross-sectional view of the magnetic disk.

On the other hand, the magnetic disk 10, which is an example of the magnetic recording medium according to the present invention, is disposed in a casing of the hard disk drive 1A together with the motor 2, the magnetic head 3, etc. As shown in FIG. 3, the magnetic disk 10 has a soft magnetic layer 12, an intermediate layer 13, and a magnetic layer 14 sequentially formed on a glass base plate 11 in the mentioned order, such that the magnetic disk 10 is capable of recording data e.g., by a perpendicular recording method. In this case, the magnetic layer 14 forms a concave/convex pattern 20 which includes plural convex portions 21 each having a protruding end thereof (upper end thereof as viewed in FIG. 3) made of a magnetic material and plural concave portions 22 formed between adjacent convex portions 21. Further, a non-magnetic material 15, such as $SiO_2$, C (carbon), and a resin material, is filled in the concave portions 22 of the concave/convex pattern 20, whereby the surface of the magnetic disk 10 is smoothed.

In this case, in the magnetic disk 10, areas where the convex portions 21 are formed correspond to recording areas for the present invention, while areas where the concave portions 22 are formed correspond to non-recording areas for the present invention. Further, in the magnetic disk 10, a protective layer 16 (DLC film) having a thickness of approximately 4 nm is formed e.g., by diamond-like carbon (DLC) in a manner covering the surfaces of the non-magnetic material 15 filled in the concave portions 22 (filled between the adjacent convex portions 21) and the magnetic layer 14 (convex portions 21). The protective layer 16 has a surface coated with lubricant (Fomblin lubricant, for example) for preventing both the magnetic head 3 and the magnetic disk 10 from being damaged.

The glass base plate 11 corresponds to a substrate for the present invention, and is formed in a disk-like shape having a thickness of approximately 0.6 mm by polishing the surface of a glass plate. It should be noted that the material of the substrate for the present invention is not limited to glass, but as the substrate, there may be used any suitable one which is formed e.g., of any of suitable non-magnetic materials, such as aluminum and ceramics, and is generally disk-shaped. The soft magnetic layer 12 is in the form of a thin film having a thickness of approximately 100 nm to 200 nm and formed by sputtering a soft magnetic material, such as a CoZrNb alloy. The intermediate layer 13 serves as an underlayer for forming the magnetic layer 14 thereon, and is in the form of a thin film having a thickness of approximately 40 nm and formed by sputtering an intermediate layer-forming material, such as Ru, Cr or a CoCr non-magnetic alloy. The magnetic layer 14 is a layer on which the concave/convex pattern 20 (a data track pattern 20t and a servo pattern 20s shown in FIG. 4) is formed, as described above, and includes the concave portions 22 formed by etching a layer sputtered e.g., with a CoCrPt alloy.

In this case, as shown in FIG. 2, in the magnetic disk 10, the servo pattern areas As are defined between the data recording areas At to define the track pattern areas At and the servo pattern areas As such that they are alternately arranged side by side in the direction of rotation of the magnetic disk 10 (direction indicated by an arrow R in FIG. 2). It should be noted that throughout the present specification, an area sandwiched by two successive data recording areas At arranged in the direction of rotation of the magnetic disk 10 (an area from an end of one data recording area At on a downstream side thereof in the direction of rotation of the magnetic disk 10 to an end of the other data recording area At on an upstream side thereof in the direction of rotation of the magnetic disk 10) is defined as a servo pattern area As. Further, as shown in FIG. 4, it is assumed that an end of each data recording area At on a side thereof in the direction of rotation of the magnetic disk 10 matches an imaginary segment (linear or arcuate segment along the radial direction of the magnetic disk 10) obtained by connecting respective ends of plural data recording tracks (convex portions 21) formed in the data recording area, in the direction of rotation of the magnetic disk 10.

Further, the hard disk drive 1A having the magnetic disk 10 mounted thereon is configured such that it rotates the magnetic disk 10 at the fixed angular velocity under the control of the control section 6, as described above. Therefore, as shown in FIG. 2, in the magnetic disk 10, the length of the data recording area At in the direction of rotation of the magnetic disk 10, and the length of the servo pattern area As in the direction of rotation of the magnetic disk 10 are defined such that they are increased as they are farther from the center O of the data track pattern 20t, in proportion to the length over which the magnetic disk 10 is caused to pass under the magnetic head 3 per unit time (the width of the data recording area At and the width of the servo pattern area As are larger in outer diameter areas thereof than in inner diameter areas thereof).

Figure 4:
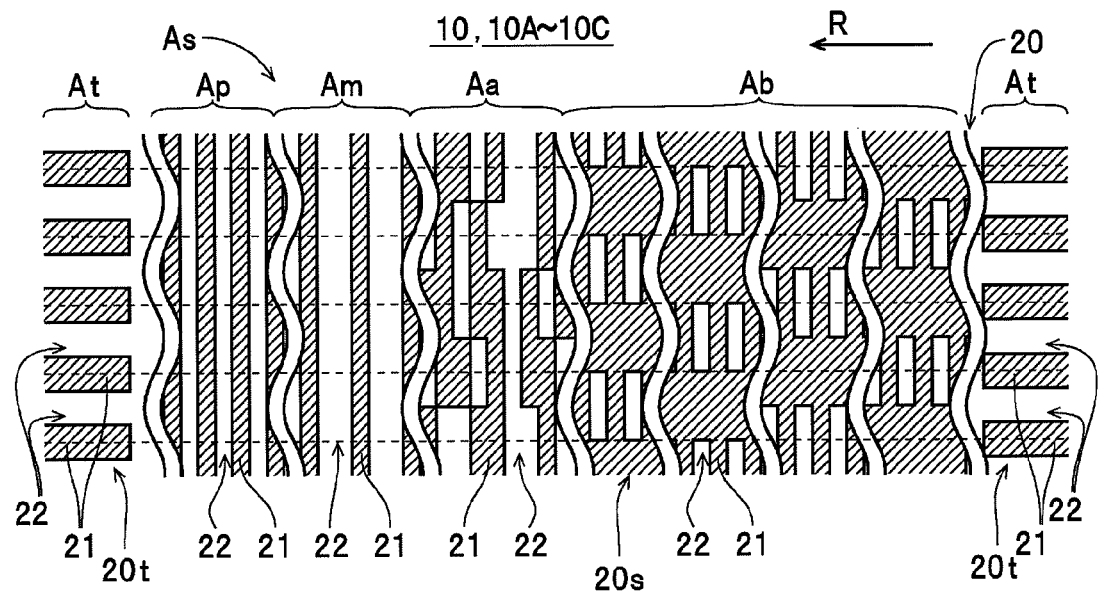
FIG. 4 is a plan view of data recording areas and servo pattern areas of the magnetic disk.

Further, as shown FIG. 4, the data recording areas At are formed with the data track pattern 20t. It should be noted that in FIG. 4 and FIGS. 9, 11, 13 and 14 referred to hereinafter, portions (recording areas in the present invention) of the concave/convex pattern 20, formed with the convex portions 21, are indicated by hatching. In this case, each portion of the data track pattern 20t in the data recording area At is comprised of plural convex portions 21 forming a large number of concentric (or helical) data-recording tracks arranged about the center O (see FIG. 2) in a manner separated from each other with a predetermined arrangement pitch (belt-like convex portions 21 continuously formed in the direction of rotation of the magnetic disk 10 such that it is elongated in the direction of rotation of the magnetic disk 10), and plural concave portions 22 (concave portions 22 between the respective convex portions 21; inter-track concave portions) forming guard band portions. In this case, although a concave/convex pattern similar to the data track pattern 20t is formed on an outermost peripheral portion and an innermost peripheral portion of the magnetic disk 10, there exist areas where convex portions 21 are formed that do not substantially contribute as the data recording tracks (e.g., areas over which the magnetic head does not move during recording and reproducing of recording data). When such areas exist, areas which are formed with the data track pattern 20t and are actually used as the data recording tracks are defined as data recording areas.

Further, the convex portion 21 and concave portion 22 in the data recording area At are defined such that e.g., the radial lengths thereof are equal to each other, and are formed such that a pitch at which the convex portions 21 are formed (i.e., a track pitch of the data recording tracks) and the radial length of the convex portions 21 (i.e., the radial lengths of the data recording tracks and the guard band portions) are equal to each other in the whole area of the magnetic disk 10 from the inner periphery to the outer periphery thereof. It should be noted that although it is preferable that the rotation center of the magnetic disk 10 and the center O of the data track pattern 20t coincide with each other, a manufacturing error can cause a very small displacement of approximately 30 to 50 μm between the rotation center of the magnetic disk 10 and the center of the data track pattern 20t. However, even with the amount of displacement to this extent, it is possible to sufficiently perform the tracking servo control of the magnetic head 3, and hence it can be considered that the rotation center of the magnetic disk 10 and the center of the data track pattern 20t are substantially the same.

On the other hand, each servo pattern area As is formed with a concave/convex pattern 20 (servo pattern 20s) including plural convex portions 21 and plural concave portions 22, which form various servo patterns for the tracking servo control. More specifically, defined in the servo pattern area As are a preamble pattern area Ap having a preamble pattern formed therein by the servo pattern 20s, a servo address mark area Am having a servo address mark (servo address pattern) formed therein by the servo pattern 20s, an address pattern area Aa having an address pattern formed therein by the servo pattern 20s, and a burst pattern area Ab having a burst pattern formed therein by the servo pattern 20s. Further, defined in the burst pattern area Ab are four burst areas associated with respective signal areas of the burst pattern. In this case, although a concave/convex pattern similar to the servo pattern 20s is formed on the outermost peripheral portion and the innermost peripheral portion of the magnetic disk 10, there are areas in which convex portions 21 and concave portions 22 are formed which do not substantially contribute as data recording tracks (e.g., areas over which the magnetic head does not move during recording and reproducing of recording data). When such areas exist, areas which are formed with the servo pattern 20s and are actually used as the servo pattern are defined as data recording areas.

The preamble pattern formed in the preamble pattern area Ap is a servo pattern which is provided for correcting a reference clock for reading various control signals e.g., from the address pattern area Aa and the burst pattern area Ab, based on the rotating state (rotational velocity) of the magnetic disk 10. In the preamble pattern, plural belt-like convex portions 21 elongated in the radial direction of the magnetic disk 10 (vertical direction as viewed in FIG. 4) are formed in a manner sandwiching concave portions 22 in the direction of rotation of the magnetic disk 10 (direction indicated by an arrow R in FIG. 4). Further, each convex portion 21 and each concave portion 22, both formed in the preamble pattern area Ap, are defined such that the lengths thereof in the direction of rotation of the magnetic disk 10 become equal to each other at radial positions where the distances from the center O are equal, and at the same time they become longer in an outer peripheral area of the magnetic disk 10 than in an inner peripheral area thereof.

Further, the servo address mark formed in the servo address mark area Am is provided for identifying a position at which the address pattern starts to be read. In the servo address mark, plural belt-like convex portions 21 elongated in the radial direction of the magnetic disk 10 (vertical direction as viewed in FIG. 4) are formed in a manner sandwiching respective concave portions 22 in the direction of rotation of the magnetic disk 10 (direction indicated by the arrow R in FIG. 4). In this case, each convex portion 21 and each concave portion 22, both formed in the servo address mark area Am are defined such that at radial positions where the distances from the center O are equal, the length of the concave portion 22 in the direction of rotation of the magnetic disk 10 becomes e.g., twice as large as that of the convex portion 21 in the direction of rotation of the magnetic disk 10, and at the same time the lengths of the concave and convex portions become longer on the outer peripheral area side of the magnetic disk 10 than on the inner peripheral area side thereof.

Furthermore, the address pattern formed in the address pattern area Aa is a servo pattern formed in a manner associated with address data indicative of a track number of a data recording track to which the magnetic head 3 is made on-track, a sector number of a sector at which the magnetic head 3 is positioned, and so forth. In the address pattern, the length of each convex portion 21 and that of each concave portion 22, in the direction of rotation of the magnetic disk 10 are defined in a manner associated with the above-described address data. Further, the burst pattern formed in the burst pattern area Ab is a pattern (position-detecting servo pattern) for use in obtaining a burst signal for correcting the position of the magnetic head 3 above the magnetic disk 10. In the magnetic disk 10, the burst pattern is formed by plural the concave portions 22 square in plan view in respective ones of four burst areas, i.e., first to fourth burst areas which are adjacent to each other in the direction of rotation of the magnetic disk 10. It should be noted that although actually, each concave portion 22 is parallelogram-shaped since a skew angle is given to each concave portion 22 in the inner peripheral area and outer peripheral area of the magnetic disk 10, description of the skew angle and illustrations thereof are omitted for ease of understanding of the present invention.

Next, a description will be given of a method of manufacturing the magnetic disk 10.

When the magnetic disk 10 is manufactured, a preform, not shown, which has the soft magnetic layer 12, the intermediate layer 13, and the magnetic layer 14 sequentially formed on the glass base plate 11 in the mentioned order, and a stamper, not shown, which is formed with a concave/convex pattern corresponding to the concave/convex pattern 20, are used. In this case, the preform for use in manufacturing the magnetic disk 10 has a metal mask layer, not shown, and a resin mask layer (resist layer, not shown) having a thickness of approximately 80 nm formed on the magnetic layer 14. On the other hand, the stamper is formed with a concave/convex pattern by which a mask pattern (concave/convex pattern; not shown) for forming the concave/convex pattern 20 (the data track pattern 20*t* and the servo pattern 20*s*) of the magnetic disk 10 can be formed on the resin mask layer, and is configured such that the magnetic disk 10 can be manufactured by an imprinting method. In this case, the concave/convex pattern of the stamper has convex portions formed in a manner corresponding to the concave portions 22 of the concave/convex pattern 20 of the magnetic disk 10, and concave portions formed in a manner corresponding to the convex portions 21 of the concave/convex pattern 20 of the magnetic disk 10.

First, the concave/convex pattern of the stamper is transferred to the resin mask layer of the preform by the imprinting method. More specifically, a surface of the stamper formed with the concave/convex pattern is pressed against the resin mask layer of the preform to thereby push the convex portions of the concave/convex pattern into the resin mask layer of the preform. In doing this, resist (resin mask layer) of portions into which the convex portions are pushed is moved into the respective concave portions of the concave/convex pattern. After that, the stamper is removed from the preform, and the resin (residue; not shown) remaining on a bottom surface of each concave portion of a concave/convex pattern (resin mask pattern), which is made of the resin mask pattern, is removed by an oxygen plasma process, whereby the concave/convex pattern (resin mask pattern) is formed on the metal mask layer of the preform.

Subsequently, by etching using the above-described resin mask pattern as a mask, the metal mask layer is etched to form a concave/convex pattern (metal mask pattern) made of the metal mask layer on the magnetic layer 14. Then, the magnetic layer 14 is etched by performing the etching process using the metal mask pattern as a mask, whereby the concave/convex pattern 20 having the plural convex portions 21 and the plural concave portions 22 is formed on the magnetic layer 14 of the preform. This forms the data track pattern 20*t* and the servo pattern 20*s* (concave/convex pattern 20) on the intermediate layer 13. Next, the metal mask layer remaining on each convex portion 21 is selectively removed by the etching process to cause a protruding end face of each convex portion 21 to be exposed.

Then, $SiO_2$ as the non-magnetic material 15 is sputtered to thereby cover the surface formed with the concave/convex pattern 20 with the non-magnetic material 15. Then, an ion beam etching process is carried out on the layer of the non-magnetic material 15 on the magnetic layer 14 (on each convex portion 21 and each concave portion 22). In doing this, the ion beam etching process is continued e.g., until the protruding end face of each convex portion 21 is caused to be exposed from the non-magnetic material 15. This smoothes the surface of the preform. Then, a thin film of diamond-like carbon (DLC) is formed by a chemical vapor deposition (CVD) method such that the thin layer covers the surface of the preform, forming the protective layer. After that, Fomblin lubricant is applied to the surface of the protective layer 16 such that the average thickness of the applied lubricant is approximately 2 nm. This completes the magnetic disk 10, as shown in FIG. 3.

Figure 6:
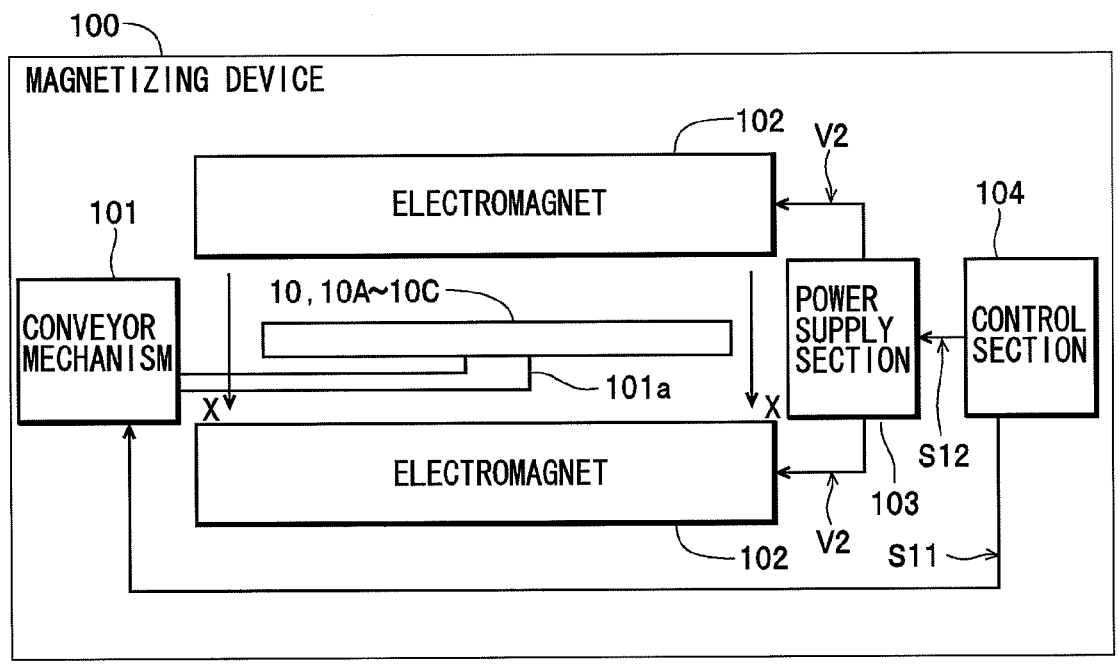
FIG. 6 is a schematic diagram of a magnetizing device.

Next, a magnetization process is carried out on the magnetic disk 10 such that the servo pattern (servo signal) can be read from the servo pattern area As in the manufactured magnetic disk 10. In doing this, first, a magnetizing device 100 shown in FIG. 6 is used to perform a process (first magnetization process in the present invention) for DC-magnetizing the convex portions 21 formed in at least the servo pattern areas As (all the servo pattern areas As and all the data recording areas At, for example) of the magnetic disk 10. In this case, the magnetizing device 100 is comprised of a conveyor mechanism 101 including a support arm 101*a* which is configured to be capable of supporting the magnetic disk 10, a pair of electromagnets 102 which applies a magnetic field to the magnetic disk 10 in a fixed direction to thereby DC-magnetize the convex portions 21 in all the areas of the magnetic disk 10, a power supply section 103 for supplying the electromagnets 102 with a DC voltage V2, and a control section 104 which causes the conveyor mechanism 101 to convey the magnetic disk 10 between the pair of electromagnets 102 and causes the power supply section 103 to supply the DC voltage V2 to the electromagnets 102.

When the magnetization process (first magnetization process) for demagnetizing the magnetic disk 10 is carried out by the above-described magnetizing device 100, first, the magnetic disk 10 is set on the support arm 101*a* of the conveyor mechanism 101. Then, when the start of the magnetization process is instructed by operating an operating section, not shown, the control section 104 outputs a control signal S11 to the conveyor mechanism 101 to cause the conveyor mechanism 101 to convey the magnetic disk 10 between the pair of electromagnets 102. Subsequently, the control section 104 outputs a control signal S12 to the power supply section 103 to cause the power supply section 103 to supply the DC voltage V2 to the electromagnets 102. At this time, magnetic fields in a direction indicated by arrows X in FIG. 6 is generated around the electromagnets 102, whereby each convex portion 21 (magnetic layer 14) of the magnetic disk 10 is DC-magnetized in a fixed direction parallel to the direction of the arrows X. Thus, the convex portions 21 (magnetic layer 14) are DC-magnetized in all the areas of the magnetic disk 10 (all the servo pattern areas As and all the data recording areas At), which completes the first magnetization process in the present invention.

Figure 7:
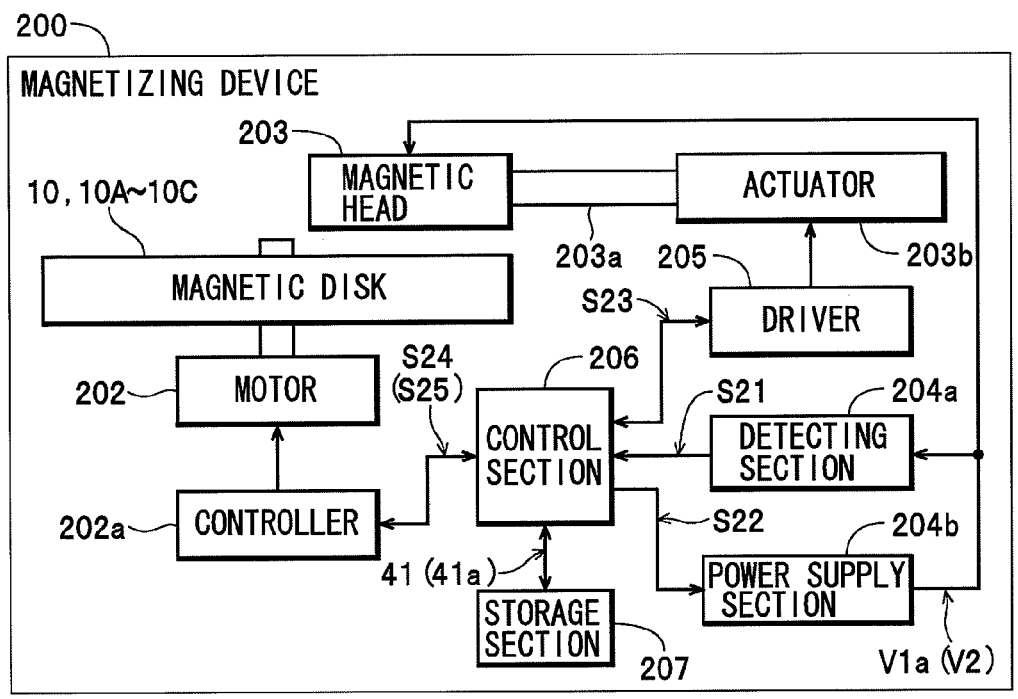
FIG. 7 is a schematic diagram of another magnetizing device.

Then, a magnetizing device 200 shown in FIG. 7 is used to carry out a process (second magnetization process in the present invention) for AC-magnetizing the convex portions 21 formed in the data recording areas At on the magnetic disk 10 on which the first magnetization process has been completed. In this case, the magnetizing device 200 is an example of a magnetic recording medium-magnetizing device in the present invention, and is comprised of a motor 202, a controller 202*a*, a magnetic head 203, a detecting section 204*a*, a power supply section 204*b*, and a driver 205, a control section 206, and a storage section 207. The motor 202 rotates the magnetic disk 10 e.g., at a fixed velocity of 4200 rpm with a constant angular velocity under the control of the controller 202*a*. Further, the controller 202*a* rotates the motor 202 in response to a control signal S24 outputted from the control section 206.

The magnetic head 203 is dedicated to the magnetization process, and includes a recording element for magnetizing a magnetic layer (recording area: the magnetic layer 14 forming the convex portions 21 in the illustrated example) e.g., of the magnetic disk 10, and a reproducing element, not shown, for reading a magnetic signal. The magnetic head 203 is configured to have an effective recording width equivalent to 100 track pitches of the data recording track, for example. The magnetic head 203 is attached to an actuator 203*b* via a swing arm 203*a*, and is moved above the magnetic disk 10 as the swing arm 203*a* is pivotally moved by the actuator 203*b* during execution of the magnetization process on the magnetic disk 10. Further, the magnetic head 203 is configured to be capable of reading servo address marks from the servo pattern areas As of the magnetic disk 10. The actuator 203*b* causes the swing arm 203*a* to swing under the control of the control section 206 by drive current supplied from the driver 205, thereby moving the magnetic head 203 to a desired position for the magnetization process, above the magnetic disk 10.

The detecting section 204*a* detects a servo pattern (e.g., a servo address mark) defined in advance, from an output signal (analog signal: servo signal) outputted from the magnetic head 203 to thereby generate a detection signal S21, and outputs the detection signal S21 to the control section 206. When the magnetization process is carried out on the magnetic disk 10, the power supply section 204*b* supplies an AC voltage V1*a*, the potential of which is inverted at a predetermined period, to the magnetic head 203 according to a control signal S22 from the control section 206, to thereby AC-magnetize the data recording tracks of the magnetic disk 10. In this case, in the magnetizing device 200, when the magnetization process is carried out on the magnetic disk 10, the AC voltage V1*a*, the potential of which is inverted at a predetermined period, is supplied to the magnetic head 203, as described above, whereby the data recording tracks (convex portions 21) of the magnetic disk 10 are AC-magnetized by a magnetic field generated under the magnetic head 203 in a manner such that the magnetization direction of the data recording tracks is inverted at a predetermined inversion period.

Further, as shown in FIG. 5, in a portion of the data recording tracks, which is AC-magnetized by the magnetizing device 200 (a portion magnetized by "AC-magnetization A" or "AC-magnetization B" in FIG. 5), the data recording tracks are AC-magnetized such that the length of an area magnetized in one direction (e.g., an area the magnetization direction of which is indicated by a downward arrow) in the direction of rotation of the magnetic disk 10 (a time period over which the magnetic head 3 of the hard disk drive 1A passes through the area), and the length of an area magnetized in the other direction (e.g., an area the magnetization direction of which is indicated by an upward arrow) in the direction of rotation of the magnetic disk 10 (a time period over which the magnetic head 3 of the hard disk drive 1A passes through the area) are constant in all the data recording areas At on the magnetic disk 10 (an example of a state in which "the inversion period of the magnetization direction in the direction of rotation of the magnetic disk is fixed in the whole AC-magnetized area" in the present invention).

Further, in the magnetizing device 200, the data recording tracks are AC-magnetized e.g., such that the magnetization direction of the data recording tracks is inverted in the direction of rotation of the magnetic disk 10 at one half (period C/2) of the shortest inversion period (period C shown in FIG. 5, in the present example) of all the inversion periods of the magnetization direction in which the data recording portion of the magnetic disk 10 mounted on the hard disk drive 1A is magnetized (the AC-magnetized data recording tracks correspond to "a portion magnetized by the AC-magnetization A": an example of an inversion period which is different from the inversion period of the magnetization direction in which recording areas are AC-magnetized during recording of recording data). In this case, the period of the above-described AC-magnetization is not limited to a period shorter than the inversion period of the magnetization direction of the data recording portion but the data recording tracks can be AC-magnetized e.g., such that the magnetization direction of the data recording tracks is inverted in the direction of rotation of the magnetic disk 10 at a period (period 6C) twice as long as the longest inversion period (period 3C shown in FIG. 5, in the present example) of all the inversion periods of the magnetization direction of the data recording portion (the AC-magnetized data recording tracks correspond to "a portion magnetized by the AC-magnetization B": another example of the inversion period which is different from the inversion period of the magnetization direction in which recording areas are AC-magnetized during recording of recording data).

It is preferable that the inversion period of the magnetization direction of the magnetized portion is set to a period which is different from the inversion periods (the period C, the period 2C and the period 3C in the illustrated example) of the magnetization direction of the data recording portion, and within a range from one fifth of the shortest inversion period in the data recording portion to three times the longest inversion period in the data recording portion. By AC-magnetizing the data recording tracks in a manner such that the magnetization direction of the data recording tracks is inverted at an inversion period within the above range, it is possible to sufficiently enhance the quality of a reproducing signal, as described hereinafter.

The driver 205 controls the actuator 203b in response to a control signal S23 input from the control section 206, to thereby move the magnetic head 203 to a desired position for the magnetization process. The control section 206 performs overall control of the magnetizing device 200. Further, the control section 206, which is an example of the control section according to the present invention, controls the controller 202a, the power supply section 204b, and the driver 205, based on the detection signal S21 (signal indicative of the detected servo address mark, in the illustrated example) input from the detecting section 204a and a magnetization process program 41 stored in the storage section 207 (execution of the magnetization process). The storage section 207 stores the above-described magnetization process program 41, and the like.

In performing a magnetization process (second magnetization process) for demagnetizing the magnetic disk 10 by the magnetizing device 200, first, the magnetic disk 10 is set on the foremost end of a rotational shaft of the motor 202. Then, when the start of the magnetization process is instructed by operating an operating section, not shown, the control section 206 starts the process for AC-magnetizing the convex portions 21 (magnetic layer 14) in the data recording areas At on the magnetic disk 10, according to the magnetization process program 41 stored in the storage section 207. More specifically, first, the control section 206 outputs the control signal S24 to the controller 202a to thereby rotate the magnetic disk 10 at a constant rotational velocity. Then, the control section 206 outputs the control signal S23 to the driver 205 to thereby move the magnetic head 203 to a position e.g., above the outermost peripheral portion of the servo pattern areas As and data recording areas At.

At this time, the concave portions 21 of all the areas of the magnetic disk 10 have been DC-magnetized by the magnetizing device 100, and hence as the servo pattern areas As of the magnetic disk 10 pass under the magnetic head 203 in accordance with rotation of the magnetic disk 10, a magnetic signal corresponding to a servo pattern in the servo pattern area As is read by the magnetic head 203, and an output signal (analog signal) corresponding to the servo pattern is outputted. On the other hand, the detecting section 204a detects e.g., a servo address mark based on the output signal from the magnetic head 203 to output the detection signal S21.

Figure 8:
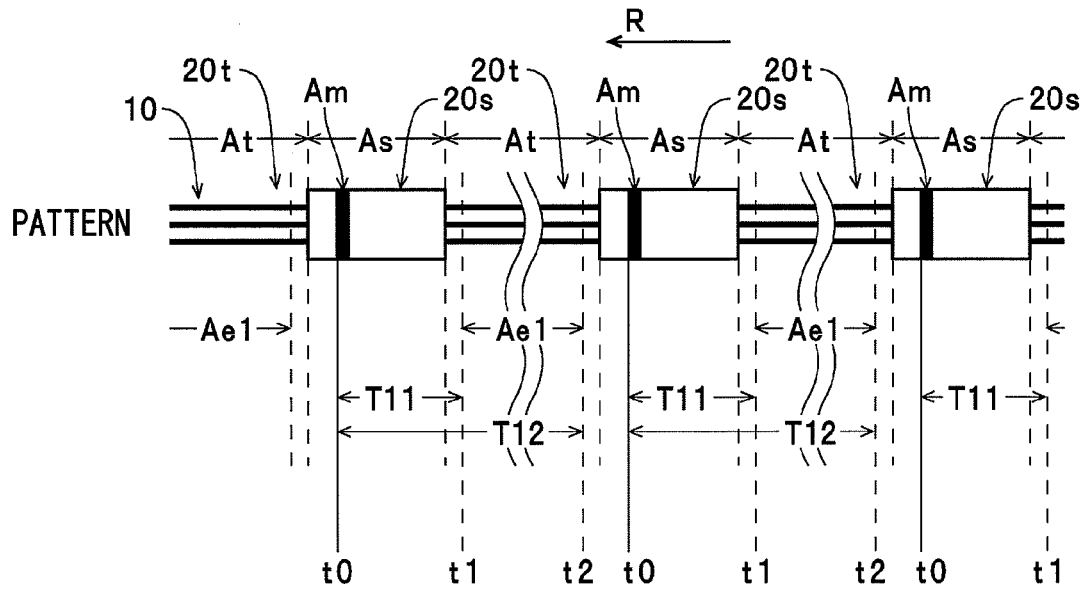
FIG. 8 is an explanatory view useful in explaining a method of magnetizing the magnetic disk by the magnetizing device.

On the other hand, the control section 206 identifies a time point t1 for starting an AC-magnetization process on each servo pattern area As, and a time point t2 (see FIG. 8) for terminating the magnetization process, respectively. More specifically, the control section 206 identifies the time point t1 and the time point t2 based on the detection signal S21 from the detecting section 204a, the rotational velocity (4200 rpm in the illustrated example) of the magnetic disk 10 during execution of the magnetization process by the magnetizing device 200, and the position of a servo address mark area Am identified based on the design data of the magnetic disk 10, and the start position (start position P1es shown in FIG. 9, in the illustrated example) and end position (end position P1ee shown in FIG. 9, in the illustrated example) of the magnetization process in the data recording area At.

Figure 9:
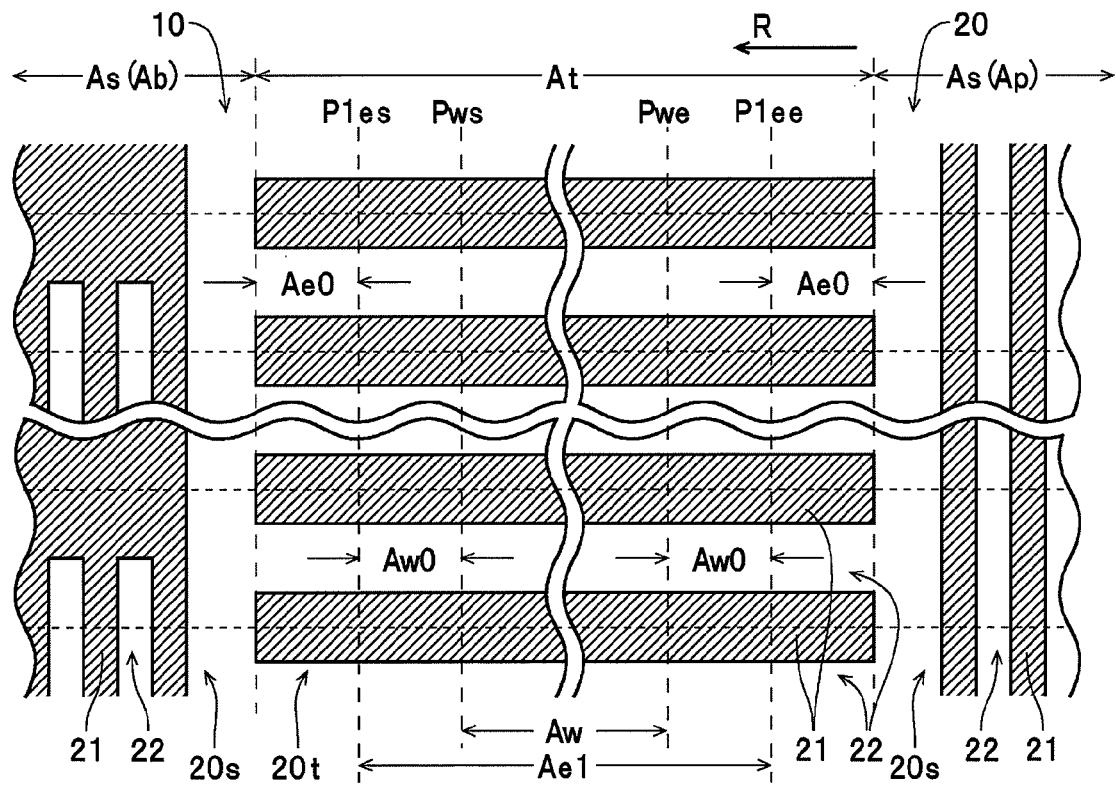
FIG. 9 is another explanatory view useful in explaining the method of magnetizing the magnetic disk by the magnetizing device.

In this case, when the whole of the data recording area At from one end to the other thereof in the direction of rotation of the magnetic disk 10 is AC-magnetized by the magnetic head 203, not only convex portions 21 in the data recording area At but also convex portions 21 on the data recording area-side ends of the respective servo pattern areas As adjacent to the data recording area At (an end of the burst pattern area Ab toward the data recording area At, and an end of the preamble pattern area Ap toward the data recording area At, in the present example) are AC-magnetized by a very small deviation of the start timing and end timing of the magnetization process, or influence of a leakage field from the magnetic head 203. This can make it difficult to read servo patterns on the end areas of the servo pattern areas As. Therefore, in the magnetizing device 200, the magnetization process program 41 is programmed not such that all the convex portions in the whole data recording area At are AC-magnetized but such that as shown in FIG. 9, convex portions 21 are AC-magnetized in an area Ae1 from the start position P1es to the end position P1ee except for two areas Ae0 (end area in the present invention) of the data recording area At toward the respective servo pattern areas As adjacent to the data recording area At in the direction of rotation of the magnetic disk 10.

Further, a time period T11 from a time point t0 when the servo address mark area Am is positioned under the magnetic head 203 in accordance with rotation of the magnetic disk 10 (the detection signal S21 is outputted from the detecting section 204a) to a time point t1 when the magnetization process on each data recording area At should be started (when the start position P1es is positioned under the magnetic head 203), and a time period T12 from the time point t0 to a time point t2 when the magnetization process on each data recording area At should be terminated (when the end position P1ee is positioned under the magnetic head 203) can be calculated based on the rotational velocity of the magnetic disk 10 and the design data (distance information) of the magnetic disk 10.

Therefore, at the time point t1 when the time period T11 has passed after the detection signal S21 was outputted from the detecting section 204a at the time point t0, the control section 206 outputs the control signal S22 to the power supply section 204b, for causing the power supply section 204b to start supply of the AC voltage V1a to the magnetic head 203. At this time, a magnetic field is generated under the magnetic head 203 by the AC voltage V1a supplied from the power supply section 204b, and the direction of the lines of a magnetic force in the magnetic field is changed alternately into opposite directions at a period corresponding to the frequency of the AC voltage V1a, so that convex portions 21 positioned under the magnetic head 203 (convex portions 21 (magnetic layer 14) forming the data recording tracks in the data recording area At, in the illustrated example) are AC-magnetized.

Further, at the time point t2 when the time period T12 has passed after the detection signal S21 was outputted from the detecting section 204a at the time point t0, the control section 206 outputs the control signal S22 to the power supply section 204b, to thereby cause the power supply section 204b to stop the supply of the AC voltage V1a to the magnetic head 203. Thus, in the data recording area At, convex portions 21 (magnetic layer 14) in the area Ae1 from the start position P1es which was positioned under the magnetic head 203 at the time point t1, to the end position P1ee which was positioned under the magnetic head 203 at the time point t2, are AC-magnetized. Then, similarly to the above-described magnetization process on the convex portions 21 in the data recording area At, the control section 206 causes AC-magnetization of convex portions 21 (magnetic layer 14) in the area Ae1 from the start position P1es to the end position P1ee in another data recording area At adjacent to the AC-magnetized data recording area At in the direction of rotation of the magnetic disk 10.

Further, when the AC-magnetization process on each data recording area At through one rotation of the magnetic disk 10 has been completed, the control section 206 outputs the control signal S23 to the driver 205, whereby the magnetic head 203 is moved toward the inner periphery of the magnetic disk 10 by the distance within a range between the effective recording width of the recording head of the magnetic head 203, as an upper limit, and approximately one half of the effective recording width, as a lower limit, to carry out the AC-magnetization process on each data recording area At. After that, when the AC-magnetization process on the innermost peripheral portion of each data recording area At has been completed, the control section 206 outputs the control signal S24 to the controller 202a, to cause the controller 202a to stop the motor 202. Thus, in every data recording area At on the magnetic disk 10, the convex portions 21 (magnetic layer 14) in the area Ae1 except for the areas Ae0 toward the respective servo pattern areas As adjacent to the data recording area At are AC-magnetized, whereby the second magnetization process in the present invention is finished. This completes the magnetic disk 10. After that, the completed magnetic disk 10 is attached to the rotational shaft of the motor 2, and attached to the casing together with the magnetic head 3, whereby the hard disk drive 1A shown in FIG. 1 is completed.

According to the above hard disk drive 1A, in the magnetic disk 10, the servo pattern areas As and the areas Ae0 and Ae0 in each data recording area At, toward the respective servo pattern areas As adjacent to the data recording area At are DC-magnetized by the above-described first and second magnetization processes, and at the same time in the data recording area At, the area Ae1 except for the areas Ae0 and Ae0 is AC-magnetized. Therefore, unlike the conventional magnetic disk having the whole of each data recording portion (all the data recording tracks) DC-magnetized, the magnetic disk 10 is configured such that in a state in which recording data is recorded on a data recording track, there exist no DC-magnetic components applied by the first magnetization process but only AC-magnetic components applied by recording of recording data and AC-magnetic components applied by the second magnetization process exist in a data recording portion of the data recording track and in the vicinity thereof (portions upstream and downstream of the data recording portion, adjacent data recording tracks, and so forth).

For this reason, when recording data is reproduced from the magnetic disk 10 having the recording data recorded thereon (having data recording tracks AC-magnetized according to the recording data), no magnetic signal in a state in which a DC-magnetic component applied by the first magnetization process is superimposed on an AC-magnetic component is read, but substantially only AC-magnetic components corresponding to the recording data are read as a reproducing signal. As a result, compared with the conventional magnetic disk, the quality of a reproducing signal which is outputted from the magnetic head during reproducing of recording data is sufficiently enhanced. In this case, in the magnetic disk 10 which has each data recording track AC-magnetized by the second magnetization process, the AC-magnetization is performed such that the magnetization direction of the data recording track is inverted at a period different from the inversion period (one half of the inversion period, in the illustrated example) of the magnetization direction of a portion (data recording portion) which is AC-magnetized by recording of the recording data, and that the inversion period of the magnetization direction is fixed in the whole AC-magnetized area. This makes it possible to prevent DC-magnetic components, which are applied to each data recording track by the second magnetization process, from being erroneously read as part of the recording data.

Further, the above hard disk drive 1A is configured such that when recording data is recorded on the magnetic disk 10, as shown in FIG. 9, magnetic signals corresponding to the recording data are recorded on an area Aw from a start position Pws to an end position Pwe without recording magnetic signals on two end areas Aw0 and Am0 of the AC-magnetized area Ae1 in the data recording area At, toward the respective servo pattern areas As adjacent to the data recording area At in the direction of rotation of the magnetic disk 10. In this case, when recording data (magnetic signals) are recorded on the whole of the area Ae1 AC-magnetized by the second magnetization process, from one end to the other of the area Ae1 in the direction of rotation of the magnetic disk 10, the areas Ae0 DC-magnetized by the first magnetization process exist at locations very close to the opposite ends of the data recording portion of the data recording track (locations upstream and downstream of the data recording portion) in the direction of rotation of the magnetic disk 10. As a result, when the recording data are reproduced, a magnetic signal is read in a state where not only AC-magnetic components applied to the data recording track (convex portions 21) in accordance with the recording of the recording data but also DC-magnetic components existing in the convex portions 21 of the area Ae0 are superimposed on the magnetic signal. This can degrade the quality of the reproducing signal.

In contrast, the hard disk drive 1A is configured, as described above, such that the magnetic signals corresponding to the recording data are recorded on the area Aw. This makes it possible to reliably prevent areas DC-magnetized by the first magnetization process from existing at locations very close to the opposite ends of the data recording portion in the direction of rotation of the magnetic disk 10.

It should be noted that although in the above-described method of manufacturing the magnetic disk 10, the process (second magnetization process) for AC-magnetizing a predetermined area in each data recording area At by the magnetizing device 200 is carried out after execution of the process (first magnetization process) for DC-magnetizing the convex portions 21 in all the areas of the magnetic disk 10 by the magnetizing device 100, this is not limitative, but it is possible to carry out the first magnetization process and the second magnetization process in the mentioned order not by using the magnetizing device 100 but by using the magnetizing device 200 alone. In this case, it is also possible to employ a method of DC-magnetizing only part of each data recording area At during execution of the first magnetization process. Also when the magnetic disk 10 is manufactured by this method, similarly to the magnetic disk 10 manufactured by the magnetizing devices 100 and 200, the servo pattern areas As and the areas Ae0 and Ae0 of the data recording area At toward the respective servo pattern areas As adjacent to the data recording area At are DC-magnetized, and at the same time the area Ae1 except for the areas Ae0 and Ae0 in the data recording area At on the magnetic disk 10 is AC-magnetized.

As described above, in the magnetic disk 10, in a state in which the recording data is not recorded in the data recording areas At, the convex portions 21 (recording areas) in the servo pattern areas As are DC-magnetized, and the convex portions 21 (data recording tracks: a recording area: the area Ae1 in the illustrated example) in each data recording area At are AC-magnetized. Further, in the magnetic disk 10, in a state in which the magnetic disk 10 is not mounted on the hard disk drive 1A (recording and reproducing device), the convex portions 21 in the servo pattern areas As are DC-magnetized, and the convex portions 21 (the area Ae1 in the illustrated example) in each data recording area At are AC-magnetized. Further, in the magnetic disk 10, the convex portions 21 in the servo pattern areas As are DC-magnetized, and the convex portions 21 (the area Ae1 in the illustrated example) in each data recording area At are AC-magnetized, while at the same time, the inversion period of the magnetization direction in the direction of rotation of the magnetic disk 10 is fixed in the whole AC-magnetized area in the data recording area At. Further, in the magnetic disk 10, the convex portions 21 in the servo pattern areas As are DC-magnetized, and the convex portions 21 (the area Ae1 in the illustrated example) in each data recording area At are AC-magnetized, while at the same time in the AC-magnetized area in the data recording area At, the inversion period of the magnetization direction in the direction of rotation of the magnetic disk 10 is different from the inversion period of a magnetization direction of AC magnetization of the convex portions 21 during recording of recording data in the data recording area At.

Therefore, according to the magnetic disk 10, the data recording tracks are AC-magnetized prior to recording of recording data, unlike the conventional magnetic disk in which convex portions (recording areas) in both the servo pattern areas and the data recording areas (all the areas in the magnetic disk) are DC-magnetized. Therefore, during reproducing of the recording data, magnetic signals in a state in which DC-magnetic components are superimposed on AC-magnetic components applied when recording the recording data are not read, but only the AC-magnetic components applied when recording the recording data can be read, thereby making it possible to sufficiently enhance the quality of a reproducing signal.

Further, in the magnetic disk 10, convex portions 21 of each data recording area At are AC-magnetized except in the areas Ae0 (end areas) toward the respective servo pattern areas As adjacent to the data recording area At in the direction of rotation of the magnetic disk 10. Therefore, according to the magnetic disk 10, it is possible to reliably read servo patterns (servo signal) from the whole of each servo pattern area As without making it difficult to read the servo patterns due to AC-magnetization of the data recording area-side ends of the respective servo pattern areas As adjacent to each data recording area At.

Further, according to the magnetic disk 10, the inversion period of the magnetization direction in the direction of rotation of the magnetic disk 10 is fixed in the whole AC-magnetized area in each data recording area At, whereby compared with a state in which the inversion period of the magnetization direction is made different depending on portions of the data recording tracks, it is possible to reliably average AC-magnetic components (AC-magnetic components of portions AC-magnetized in a fixed period) applied to the data recording tracks before recording of recording data, whereby it is possible to reliably read only AC-magnetic components applied when recording the recording data, during reproducing of the recording data is reproduced. As a result, according to the magnetic disk 10, it is possible to further enhance the quality of the reproducing signal.

Further, according to the magnetic disk 10, in an AC-magnetized area in each data recording area At, the AC-magnetization is carried out such that the inversion period of the magnetization direction in the direction of rotation of the magnetic disk 10 is different from the inversion period of a magnetization direction of AC-magnetization of the convex portions 21 during recording of recording data in the data recording area At, whereby unlike a magnetic recording medium which is AC-magnetized during execution of the AC-magnetization process at the same inversion period as during the recording of the recording data, it is possible to prevent AC-magnetic components applied by the AC-magnetization process from being erroneously read as part of the recording data.

Further, the hard disk drive 1A is comprised of the magnetic disk 10, the magnetic head 3 for performing the recording and reading of a magnetic signal, and the control section 6 for controlling the recording and reading of the magnetic signal by the magnetic head 3. Therefore, according to the hard disk drive 1A, the quality of the reproducing signal for use in reading recording data from the magnetic disk 10 is sufficiently enhanced, whereby it is possible to read the recording data with high accuracy.

Further, in the hard disk drive 1A, when recording data is recorded on the magnetic disk 10, the control section 6 causes the recording data to be recorded in convex portions 21 (data recording tracks: recording area) of each data recording area At except for end areas (areas Aw0) of an area AC-magnetized before recording of the recording data toward the respective servo pattern areas As adjacent to the data recording area At in the direction of rotation of the magnetic disk 10. Therefore, according to the hard disk drive 1A, it is possible to reliably prevent DC-magnetized areas from existing at locations close to a data recording portion, and hence when the recording data is reproduced, it is possible to read only AC-magnetic components applied to the data recording tracks (convex portions 21) in accordance with the recording of the recording data, thereby making it possible to further enhance the quality of a reproducing signal.

Further, in the method of magnetizing the magnetic disk 10 by the magnetizing devices 100 and 200, the first magnetization process for DC-magnetizing convex portions 21 in at least the servo pattern areas As (all the servo pattern areas As and all the data recording areas At, for example) of the magnetic disk 10, and the second magnetization process for AC-magnetizing convex portions 21 in the data recording areas At while rotating the magnetic disk 10 are carried out in the mentioned order. Therefore, according to the method of magnetizing the magnetic disk 10 by the magnetizing devices 100 and 200, the data recording tracks are AC-magnetized prior to recording of recording data on the magnetic disk 10, so that during reproducing of the recording data recorded on the magnetic disk 10, no magnetic signals in a state in which DC-magnetic components are superimposed on AC-magnetic components applied when recording the recording data are read, but only the AC-magnetic components applied when recording the recording data can be read, whereby it is possible to provide a magnetic disk 10 having a sufficiently high quality of a reproducing signal.

In the method of magnetizing the magnetic disk 10 by the magnetizing device 200, during execution of the AC-magnetization process, the magnetizing device 200 detects a servo pattern (servo address mark, in the illustrated example) defined in advance from each servo pattern area As while rotating the magnetic disk 10, and then causes the power supply section 204b to supply the AC voltage V1a to the magnetic head 203 when the time period T11 from a time point (time point t0) when the magnetizing device 200 detected the servo pattern to the time point t1 when the magnetizing device 200 should start the AC-magnetization process on each data recording area At (when the start position P1es is positioned under the magnetic head 203) has passed.

Therefore, according to the magnetizing device 200, in spite of the very simple configuration thereof, it is possible to accurately identify the start timing of the AC-magnetization process to reliably AC-magnetize convex portions 21 within a desired range (convex portions 21 in the area Ae1 from the start position P1es to the end position P1ee, in the illustrated example).

Next, a description will be given of another method of manufacturing the magnetic disk 10. It should be noted that as to a magnetic disk 10 manufactured by a method described hereinafter, a hard disk drive 1A having the magnetic disk 10 mounted thereon, and a magnetizing device 200 used for manufacturing the magnetic disk 10, component elements having the same functions as those of the component elements of the aforementioned magnetic disk 10, hard disk drive 1A, and magnetizing device 200 are designated by identical reference numerals and duplicate description thereof is omitted.

Although in the above-described method (method of magnetizing the magnetic disk 10), the convex portions 21 are DC-magnetized by the magnetizing device 100 in all the areas of a magnetic disk 10 which has the protective layer 16 formed thereon with lubricant applied to the surface of the protective layer 16, whereafter only the convex portions 21 in the data recording areas At are AC-magnetized using the magnetizing device 200, the method of magnetizing the magnetic recording medium according to the present invention is not limited to this. For example, it is possible to employ a method in which the magnetic disk 10, which has the protective layer 16 formed thereon with lubricant applied to the surface of the protective layer 16, is set in the magnetizing device 200, so as to DC-magnetize the convex portions 21 in the servo patter areas As and AC-magnetize the convex portions 21 in the data recording areas At.

More specifically, first, the magnetic disk 10 to be subjected to the magnetization process is set on the rotational shaft of the motor 202 of the magnetizing device 200. Then, when the start of the magnetization process is instructed by operating an operating section, not shown, the control section 206 starts the process for magnetizing the magnetic disk 10, according to a magnetization process program 41a stored in the storage section 207. In this process, first, the control section 206 outputs the control signal S24 to the controller 202a to thereby rotate the magnetic disk 10 at a constant rotational velocity. Next, the control section 206 outputs the control signal S23 to the driver 205 to thereby move the magnetic head 203 to a position e.g., above the outermost peripheral portion of one of the servo pattern areas As or data recording areas At. Subsequently, the control section 206 outputs the control signal S22 to the power supply section 204b, for causing the power supply section 204b to supply the DC voltage V2 to the magnetic head 203 for a predetermined time period (e.g., during one rotation of the magnetic disk 10). At this time, a magnetic field is generated under the magnetic head 203, to thereby DC-magnetize convex portions 21 on portions of the magnetic disk 10, having passed under the magnetic head 203.

Figure 10:
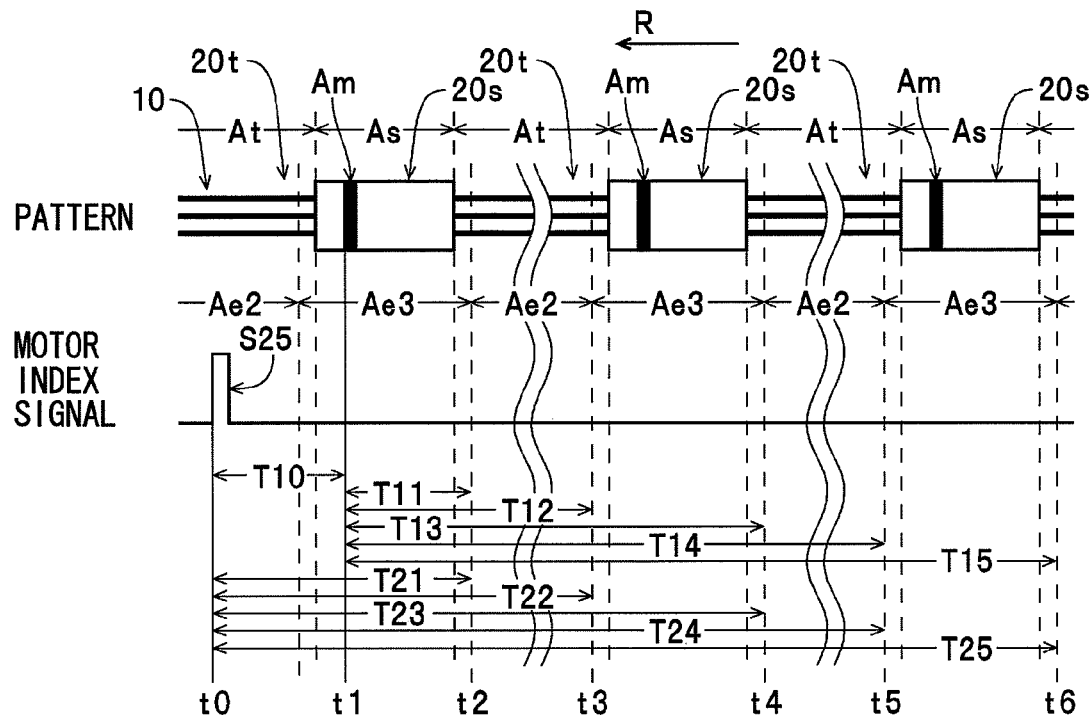
FIG. 10 is an explanatory view useful in explaining another method of magnetizing the magnetic disk by the magnetizing device.

At this time, the magnetic disk 10 has been DC-magnetized by the magnetic head 203, whereby when one of the servo pattern areas As of the magnetic disk 10 passes under the magnetic head 203 in accordance with rotation of the magnetic disk 10, a magnetic signal corresponding to a servo pattern in the servo pattern area As is read by the magnetic head 203 to output an output signal (analog signal) corresponding to the servo pattern. On the other hand, the detecting section 204a detects a servo pattern (e.g., servo address mark) defined in advance, based on the output signal from the magnetic head 203. Further, the control section 206 identifies time points t2, t4 . . . when the AC-magnetization process on each data recording area At should be started, time points t3, t5 . . . when the AC-magnetization process on each data recording area At should be terminated (see FIG. 10), time points t3, t5 . . . when the DC-magnetization process (the first magnetization process in the present invention) on each servo pattern area As is started, and time points t4, t6 . . . when the DC-magnetization process on each servo pattern area As should be terminated (see FIG. 10), respectively.

More specifically, the control section 206 identifies the time points t2, t3 . . . , based on the detection signal S21 from the detecting section 204a, a motor index signal S25 from the controller 202a, the rotational velocity of the magnetic disk 10 during execution of the magnetization process by the magnetizing device 200, the position of the servo address mark area Am identified based on the design data of the magnetic disk 10, the start position (start position P2es shown in FIG. 11, in the illustrated example) and end position (end position P2ee shown in FIG. 11, in the illustrated example) of the AC-magnetization process in the data recording area At, and the start position (start position P3es shown in FIG. 11, in the illustrated example) and end position (end position P3ee shown in FIG. 11, in the illustrated example) of the DC-magnetization process.

In this case, when only convex portions 21 in each servo pattern area As between one end to the other thereof in the direction of rotation of the magnetic disk 10 are DC-magnetized by the magnetic head 203, convex portions 21 in the end areas of the servo pattern area As toward the respective data recording areas At adjacent to the servo pattern area As are not DC-magnetized, which can make it difficult to read servo patterns on the end areas of the servo pattern area As. Further, when the whole of each data recording area At from one end to the other thereof in the direction of rotation of the magnetic disk 10 is AC-magnetized by the magnetic head 203, not only convex portions 21 in the data recording area At but also convex portions 21 on the data recording area-side ends of the respective servo pattern areas As adjacent to the data recording area At (an end of the burst pattern area Ab toward the data recording area At, and an end of the preamble pattern area Ap toward the data recording area At, in the illustrated example) are AC-magnetized by a very small deviation of the start timing and end timing of the magnetization process, or the influence of the leakage field from the magnetic head 203. This can make it difficult to read servo patterns on the end areas of the servo pattern areas As.

Figure 11:
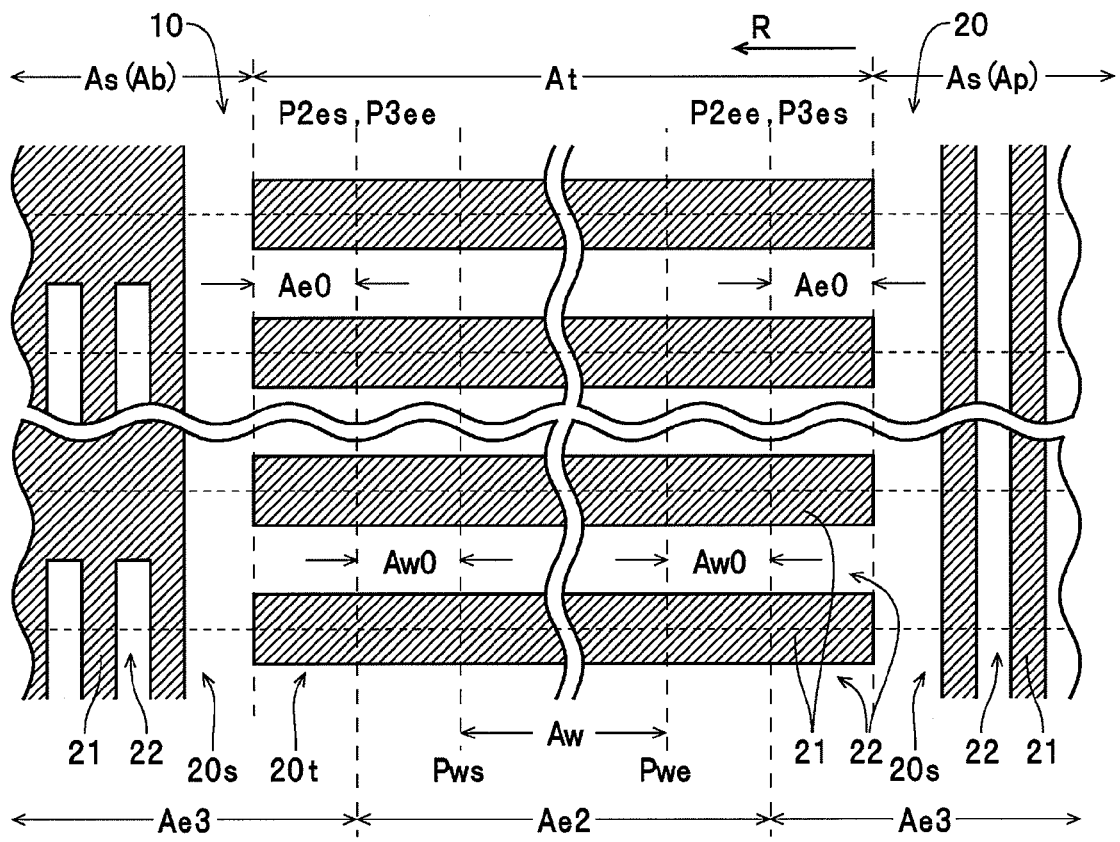
FIG. 11 is another explanatory view useful in explaining another method of magnetizing the magnetic disk by the magnetizing device.

Therefore, in the magnetizing device 200, the magnetization process program 41a is programmed not such that only the convex portions 21 in each servo pattern area As are DC-magnetized or the convex portions 21 in the whole of each data recording area At are AC-magnetized but such that as shown in FIG. 11, the convex portions 21 (magnetic layer 14) are DC-magnetized not only in the servo pattern area As but also in an area Ae3 from the start position P3es to the end position P3ee, whereby the convex portions 21 are DC-magnetized in the areas Ae0 (end area in the present invention) of the data recording area At toward the servo pattern areas As in the direction of rotation of the magnetic disk 10 are also DC-magnetized, and the convex portions 21 (magnetic layer 14) in the data recording area At are AC-magnetized in an area Ae2 from the start position P2es to the end position P2ee except for the areas Ae0.

Further, the motor index signal S25 is a reference signal outputted from the controller 202 e.g., once per one rotation of the magnetic disk 10 in synchronism with rotation of the magnetic disk 10 (reference signal outputted from a rotating mechanism in synchronism with rotation of the magnetic recording medium by the rotating mechanism). A time period T10 from a time point t0 when the motor index signal S25 is outputted, to a time point t1 when the servo address mark is detected by the detecting section 204*a* to output the detection signal S21 (when the servo address mark area Am is positioned under the magnetic head 203) is always constant insofar as the magnetic disk 10 is rotated at a constant rotational velocity. Therefore, in the magnetizing device 200, as described hereinafter, the start timing and end timing of the AC-magnetization process and those of the DC-magnetization process are defined based on the motor index signal S25 as the reference signal and the detection signal S21 outputted when the servo address mark as a servo pattern defined in advance is detected.

It should be noted that the time periods T11, T13 . . . from the time point t1 when the servo address mark area Am is positioned under the magnetic head 203 along with rotation of the magnetic disk 10 (when the detection signal S21 is outputted from the detecting section 204*a*) to the time points t2, t4 . . . when the AC-magnetization process on each data recording area At should be started (when the start position P2*es* is positioned under the magnetic head 203), and the time periods T12, T14 . . . from the time point t1 to the time points t3, t5 . . . when the AC-magnetization process on each data recording area At should be terminated (when the end position P2*ee* is positioned under the magnetic head 203) can be calculated based on the rotational velocity of the magnetic disk 10 and the design data (distance information) of the magnetic disk 10. Similarly, the time periods T12, T14 . . . from the time point t1 to the time points t3, t5 . . . when the DC-magnetization process on each servo pattern area As should be started (when the start position P3*es* is positioned under the magnetic head 203), and the time periods T13, T15 . . . from the time point t1 to the time points t4, t6 . . . when the DC-magnetization process on each servo pattern area As should be terminated (when the end position P3*ee* is positioned under the magnetic head 203) can be calculated based on the rotational velocity of the magnetic disk 10 and the design data (distance information) of the magnetic disk 10.

Therefore, at the time point t2 when a time period T21 (total time period of the above-described time periods T10 and T11) has passed after the motor index signal S25 was outputted from the controller 202*a* at the time point t0, the control section 206 outputs the control signal S22 to the power supply section 204*b*, to thereby cause the power supply section 204*b* to start supply of the AC voltage V1*a* to the magnetic head 203. At this time, a magnetic field is generated under the magnetic head 203 by the AC voltage V1*a* supplied from the power supply section 204*b*, and the direction of the lines of a magnetic force in the magnetic field is changed alternately into opposite directions at a period corresponding to the frequency of the AC voltage V1*a*, so that convex portions 21 (convex portions 21 (magnetic layer 14) forming the data recording tracks in the data recording area At, in the illustrated example) positioned under the magnetic head 203 are AC-magnetized.

Further, at the time point t3 when a time period T22 (total time period of the above-described time periods T10 and T12) has passed from the time point t0, the control section 206 outputs the control signal S22 to the power supply section 204*b*, to thereby cause the power supply section 204*b* to stop the supply of the AC voltage V1*a* to the magnetic head 203. Thus, convex portions 21 (magnetic layer 14) are AC-magnetized in the area Ae2 of the data recording area At from the start position P2*es* which was positioned under the magnetic head 203 at the time point t2, to the end position P2*ee* which was positioned under the magnetic head 203 at the time point t3. Further, the control section 206 causes the power supply section 204*b* to stop the supply of the AC voltage V1*a* to the magnetic head 203, and at the same time causes the power supply section 204*b* to start supply of the DC voltage V2 to the magnetic head 203. This causes a magnetic field to be generated under the magnetic head 203 by the DC voltage V2 supplied from the power supply section 204*b*, whereby convex portions 21 positioned under the magnetic head 203 (convex portions 21 (magnetic layer 14) in the area Ae0 of the data recording area At, in the illustrated example), and convex portions 21 (magnetic layer 14) in the adjacent servo pattern area As are DC-magnetized.

Furthermore, at the time point t4 when a time period T23 (total time period of the above-described time periods T10 and T13) has passed from the time point t0, the control section 206 outputs the control signal S22 to the power supply section 204*b*, to thereby cause the power supply section 204*b* to stop the supply of the DC voltage V2 to the magnetic head 203. Thus, convex portions 21 (magnetic layer 14) are DC-magnetized in the area Ae3 from the start position P3*es* which was positioned under the magnetic head 203 at the time point t3 to the end position P3*ee* which was positioned under the magnetic head 203 at the time point t4. Subsequently, similarly to the above-described procedure, the control section 206 alternately caries out the AC-magnetization process and the DC-magnetization process on a data recording area At adjacent to the DC-magnetized servo pattern area As, and a servo pattern area As adjacent to the data recording area At.

Further, when the AC-magnetization process and the DC-magnetization process are carried out on each data recording area At and each servo pattern area As during one rotation of the magnetic disk 10, respectively, the control section 206 outputs the control signal S23 to the driver 205, to thereby cause the magnetic head 203 to move toward the inner periphery of the magnetic disk 10 by the distance within the range between the effective recording width of the recording head of the magnetic head 203, as an upper limit, and approximately one half of the effective recording width, as a lower limit, so as to carry out the AC-magnetization process on each data recording area At and the DC-magnetization process on each servo pattern area As, similarly to the procedure applied to the data recording area At and the servo pattern area As on the outermost peripheral portion thereof.

After that, when the AC-magnetization process on the innermost peripheral portion of each data recording area At, and the DC-magnetization process on the innermost peripheral portion of each servo pattern area As have been completed, the control section 206 outputs the control signal S24 to the controller 202*a*, to thereby cause the controller 202*a* to stop the motor 202. From the above, convex portions 21 (magnetic layer 14) in every data recording area At on the magnetic disk 10 are AC-magnetized in the area Ae2 except for the areas Ae0 toward the respective servo pattern areas As adjacent to the data recording area At, and at the same time convex portions 21 are DC-magnetized in the areas Ae0 of the data recording area At and the whole of the servo pattern area As (area Ae3). This completes the magnetic disk 10. After that, the completed magnetic disk 10 is attached to the rotational shaft of the motor 2, and is attached to the casing together with the magnetic head 3, whereby the hard disk drive 1A shown in FIG. 1 is completed.

As described above, in the method of magnetizing the magnetic disk 10 by the magnetizing device 200, he convex portions 21 in the servo pattern areas As are DC-magnetized while rotating the magnetic disk 10, and the convex portions 21 in the data recording areas At are AC-magnetized. Therefore, according to the method of magnetizing the magnetic disk 10 by the magnetizing device 200, the data recording tracks are AC-magnetized prior to recording of recording data on the magnetic disk 10, whereby during reproducing of the recording data recorded on the magnetic disk 10, magnetic signals in a state in which DC-magnetic components are superimposed on AC-magnetic components applied when recording the recording data are not read, but only the AC-magnetic components applied when recording the recording data can be read. This makes it possible to provide a magnetic disk 10 having a sufficiently high quality of a reproducing signal.

Further, in the method of magnetizing the magnetic disk 10 by the magnetizing device 200, during execution of the AC-magnetization process, the time points t2, t4 . . . when the AC-magnetization process on each data recording area At should be started (when the start position P2es is positioned under the magnetic head 203), the time points t3, t5 . . . when the above AC-magnetization process should be terminated (when the end position P2ee is positioned under the magnetic head 203), the time points t3, t5 . . . when the DC-magnetization process on each servo pattern area As should be started (when the start position P3es is positioned under the magnetic head 203), and the time points t4, t6 . . . when the above DC-magnetization process should be terminated (when the end position P3ee is positioned under the magnetic head 203) are identified with reference to a time point (time point t0) when a reference signal (reference signal outputted from the rotating mechanism in synchronism with rotation of the magnetic recording medium by the rotating mechanism) which is outputted from the controller 202a in synchronism with rotation of the magnetic disk 10. Thus, the magnetic disk is magnetized.

Therefore, according to the method of magnetizing the magnetic disk 10 by the magnetizing device 200, in spite of the very simple configuration thereof, it is possible to accurately identify the start timing and end timing of the AC-magnetization process to reliably AC-magnetize convex portions 21 within a desired range (convex portions 21 in the area Ae2 from the start position P2es to the end position P2ee, in the illustrated example), and accurately identify the start timing and end timing of the DC-magnetization process to reliably DC-magnetize convex portions 21 within a desired range (convex portions 21 in the area Ae3 from the start position P3es to the end position P3ee, in the illustrated example).

It should be noted that although in the method of magnetizing the magnetic disk 10 by the magnetizing device 200, the start timing and end timing of the AC-magnetization process, and the start timing and end timing of the DC-magnetization process are identified with reference to the reference signal (motor index signal S25) outputted from the controller 202a, this is not limitative. For example, it is possible to employ a construction in which a process for DC-magnetizing convex portions 21 within a predetermined range (e.g., approximately one fourth of the periphery of the magnetic disk) while rotating the magnetic disk 10 in a state in which the magnetic head 203 is moved e.g., to the outermost peripheral portion of the servo pattern areas As or data recording areas At, detecting a servo pattern (e.g., a servo address mark) defined in advance from any servo pattern area As within the predetermined range subjected to the DC-magnetization, and identifying the time points t2, t4 . . . when the AC-magnetization process on each data recording area At should be started (when the start position P2es is positioned under the magnetic head 203), the time points t3, t5 . . . when the above AC-magnetization process should be terminated (when the end position P2ee is positioned under the magnetic head 203), the time points t3, t5 . . . when the DC-magnetization process on each servo pattern area As should be started (when the start position P3es is positioned under the magnetic head 203), and the time points t4, t6 . . . when the above DC-magnetization process should be terminated (when the end position P3ee is positioned under the magnetic head 203), with reference to a time point (time point t1 in FIG. 10) of detection of the servo pattern, thereby magnetizing the magnetic disk, is carried out plural times until convex portions in the innermost peripheral portions of each servo pattern area As and each data recording area At are also magnetized.

Further, as described above, although in the method of DC-magnetizing the convex portions 21 in all the areas of the magnetic disk 10 by the magnetizing device 100, and AC-magnetizing the convex portions 21 in each data recording area At of the magnetic disk 10 set on the magnetizing device 200, a servo pattern (servo address mark) defined in advance is detected from each servo pattern area As during execution of the AC-magnetization process by the magnetizing device 200, and timing for starting the AC-magnetization process on each data recording area At is identified with reference to the time point when the servo pattern was detected (time point t0 in FIG. 8), this is not limitative. For example, it is possible to employ a construction in which during execution of the AC-magnetization process by the magnetizing device 200, the time point t1 when the magnetizing device 200 should start the AC-magnetization process on each data recording area At (when the start position P1es is positioned under the magnetic head 203), and the time point t2 when the magnetizing device 200 should terminate the AC-magnetization process (when the end position P1ee is positioned under the magnetic head 203) are identified with reference to a time point of output of the reference signal which is outputted in synchronism with the rotation of the magnetic disk 10 (reference signal outputted from the rotating mechanism in synchronism with rotation of the magnetic recording medium by the rotating mechanism), to thereby magnetize the magnetic disk 10.

Next, a magnetic recording medium, a recording and reproducing device, and a method of magnetizing the magnetic recording medium, according to a second embodiment of the present invention will be described with reference to FIGS. 12 and 13. It should be noted that component elements having the same functions as those of the component elements of the above-described magnetic disk 10, the hard disk drive 1A having the magnetic disk 10 mounted thereon, and magnetizing devices 100 and 200 are designated by identical reference numerals and duplicate description thereof will be omitted. Further, the process for recording data on the magnetic disk 10 is the same as the recording process by the hard disk drive 1A and duplicate description thereof is omitted.

Figure 12:
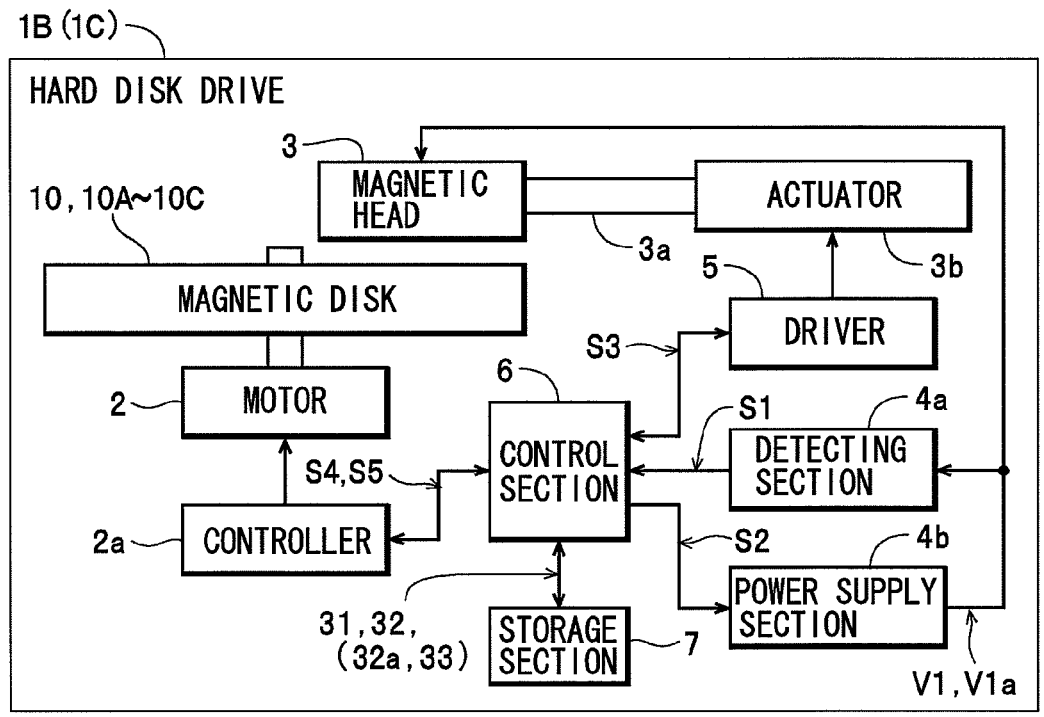
FIG. 12 is a schematic diagram of a hard disk drive as a recording and reproducing device according to a second embodiment of the present invention and a third embodiment of the present invention.
Figure 13:
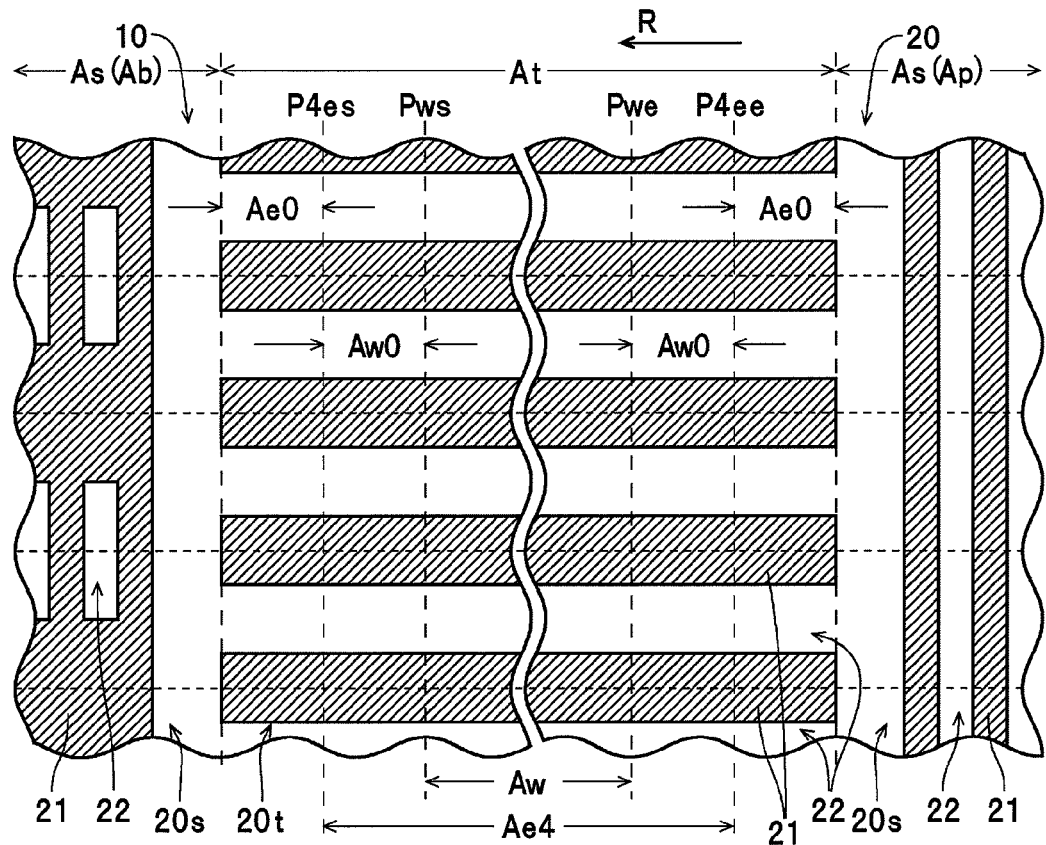
FIG. 13 is an explanatory view useful in explaining a method of magnetizing the magnetic disk by the hard disk drive as the recording and reproducing device according to the second embodiment.

Unlike the above-described hard disk drive 1A, a hard disk drive 1B shown in FIG. 12 as the recording and reproducing device according to the second embodiment has the magnetic disk 10 installed therein which has the servo pattern areas As and the data recording areas At DC-magnetized e.g., by the magnetizing device 100 (i.e., the magnetic disk 10 in the same magnetized state as that of the conventional magnetic disk). Further, in the hard disk drive 1B, a magnetization process program 32, which is provided for executing the AC-magnetization process in the present invention to thereby AC-magnetize the convex portions (data recording tracks) in the data recording areas At at a predetermined time point before recording of recording data in the data recording areas At, is stored in the storage section 7. In this case, the term "predetermined time point" is intended to include various states including a time point when a command for instructing initialization of the magnetic disk 10 (initialization command) is issued from an external device (a personal computer or a video recording and reproducing apparatus) to which the hard disk drive 1B is connected, or a time point when electric power is supplied to the hard disk drive 1B. Hereinafter, the operating principles of the hard disk drive 1B will be described assuming that the storage section 7 stores the magnetization process program 32 which executes the AC-magnetization process at the predetermined time point defined as a time point the initialization command is issued from the external device.

In the hard disk drive 1B, when the initialization command is issued from the external device having the hard disk drive 1B connected thereto, the control section 6 starts an AC-magnetization process for AC-magnetizing the convex portions 21 in each data recording area At on the magnetic disk 10, according to the magnetization process program 32 stored in the storage section 7. It should be noted that an inversion period during execution of the AC-magnetization process in the method according to the present embodiment is identical to the inversion period during execution of the AC-magnetization process by the above-described magnetizing device 200 and hence detailed description thereof is omitted.

During execution of the present AC-magnetization process, first, the control section 6 outputs the control signal S4 to the controller 2a to thereby rotate the magnetic disk 10 at a constant rotational velocity. Then, the control section 6 outputs the control signal S3 to the driver 5 to thereby move the magnetic head 3 to a location e.g., above a data recording track at the outermost peripheral portion of the magnetic disk 10. At this time, the concave portions 21 of all the areas of the magnetic disk 10 mounted on the hard disk drive 1B have been DC-magnetized, and hence when one of the servo pattern areas As of the magnetic disk 10 passes under the magnetic head 3 in accordance with rotation of the magnetic disk 10, a magnetic signal corresponding to a servo pattern in the servo pattern area As is read by the magnetic head 3, and an output signal (analog signal) corresponding to the servo pattern is outputted. On the other hand, the detecting section 4a detects e.g., a servo address mark based on the output signal from the magnetic head 3.

Further, the control section 6 identifies a time point for starting an AC-magnetization process in a data recording area At containing the data recording track, and a time point for terminating the AC-magnetization process, based on the detection signal S1 from the detecting section 4a, the rotational velocity of the magnetic disk 10, the position of the servo address mark area Am identified based on the design data of the magnetic disk 10, and the start position and end position of the AC-magnetization process in the data recording area At. In this case, when the whole of the data recording area At from one end to the other thereof in the direction of rotation of the magnetic disk 10 is AC-magnetized by the magnetic head 3, there is a risk that it becomes difficult to read servo patterns on the end areas of servo pattern areas As adjacent to the data recording area At, as described above. Therefore, in the hard disk drive 1B, the magnetization process program 32 is programmed not such that all the convex portions 21 in the whole of each data recording area At are AC-magnetized but such that as shown in FIG. 13, convex portions 21 (magnetic layer 14) are AC-magnetized in an area Ae4 from a start position P4es to an end position P4ee except for the two areas Ae0 (end area in the present invention) of the data recording area At toward the respective servo pattern areas As adjacent to the data recording area At in the direction of rotation of the magnetic disk 10.

On the other hand, a time period (hereinafter referred to as "the first time period") from a time point when the servo address mark area Am is positioned under the magnetic head 3 in accordance with rotation of the magnetic disk 10 (the detection signal S1 is outputted from the detecting section 4a) to a time point when the magnetization process on each data recording area At should be started (when the start position P4es is positioned under the magnetic head 3), and a time period (hereinafter referred to as "the second time period") from the time point when the detection signal S1 is outputted to a time point when the magnetization process on each data recording area At should be terminated (when the end position P4ee is positioned under the magnetic head 3) can be calculated based on the rotational velocity of the magnetic disk 10 and the design data (distance information) of the magnetic disk 10.

Therefore, when the above-described first time period has passed after the detection signal S1 was outputted from the detecting section 4a, the control section 6 outputs the control signal S2 to the power supply section 4b, to thereby cause the power supply section 4b to start supply of the AC voltage V1a to the magnetic head 3. At this time, a magnetic field is generated under the magnetic head 3 by the AC voltage V1a supplied from the power supply section 4b, and the direction of the lines of a magnetic force in the magnetic field is changed alternately into opposite directions at a period corresponding to the frequency of the AC voltage V1a, so that convex portions 21 positioned under the magnetic head 3 (convex portions 21 (magnetic layer 14) forming the data recording tracks in the data recording area At, in the illustrated example) are AC-magnetized.

Further, when the above-described second time period has passed after the detection signal S1 was outputted from the detecting section 4a, the control section 6 outputs the control signal S2 to the power supply section 4b, to thereby cause the power supply section 4b to stop the supply of the AC voltage V1a to the magnetic head 3. Thus, in the data recording area At, convex portions 21 (magnetic layer 14) in the area Ae4 from the start position P4es to the end position P4ee are AC-magnetized. Subsequently, similarly to the magnetization process on the convex portions 21 in the above-described data recording area At, the control section 6 causes convex portions 21 (magnetic layer 14) to be AC-magnetized in an area Ae4 from a start position P4es to an end position P4ee in another data recording area At adjacent to the AC-magnetized data recording area At, on the same data recording track, in the direction of rotation of the magnetic disk 10.

Further, when the AC-magnetization process carried out on each data recording area At during one rotation of the magnetic disk 10 has been completed, the control section 6 outputs the control signal S3 to the driver 5, to thereby cause the magnetic head 3 to move to a position above a data recording track by one track toward the inner periphery of the magnetic disk 10, and carries out the AC-magnetization process on each data recording area At on the data recording track, similarly to the above-described magnetization process. Furthermore, when the AC-magnetization process carried out on each data recording area At during one rotation of the magnetic disk 10 has been completed, the control section 6 outputs the control signal S3 to the driver 5, to thereby cause the magnetic head 3 to move to a position above a data recording track by one track toward the inner periphery of the magnetic disk 10, and carries out the AC-magnetization process on each data recording area At on the data recording track, similarly to the above-described magnetization process.

After that, the control section 6 causes data recording tracks to be sequentially AC-magnetized in each data recording area At from the outermost peripheral portion to the innermost peripheral portion. Thus, in the magnetic disk 10 in the hard disk drive 1B, similarly to the magnetic disk 10 magnetized by the magnetizing device 100 and the magnetizing device 200 and the magnetic disk 10 magnetized only by the magnetizing device 200, convex portions 21 (magnetic layer 14), which are formed in the area Ae4 except for the areas Ae0 toward respective servo pattern areas As adjacent to the data recording area At, are AC-magnetized. Then, partitions of a desired size can be secured according to a known procedure, whereby the initialization of the magnetic disk 10 is completed to make recording data recordable.

As described above, in the hard disk drive 1B, the control section 6 executes the AC-magnetization process for AC-magnetizing convex portions 21 (data recording tracks: recording area) in each data recording area At via the magnetic head 3 at a predetermined time point (time point of execution of the initialization process, in the illustrated example) before recording of recording data in the data recording area At. Therefore, according to the hard disk drive 1B, unlike the recording and reproducing device configured to record recording data on DC-magnetized data recording tracks, it is possible to read only AC-magnetic components applied when recording the recording data, during reproducing of the recording data without reading magnetic signals in a state in which DC-magnetic components are superimposed on the AC-magnetic components applied when recording the recording data. As a result, according to the hard disk drive 1B, it is possible to read recording data with high accuracy.

Further, in the hard disk drive 1B, when an instruction command (initialization command in the illustrated example) is issued from an external device (personal computer or the like in the illustrated example), the control section 6 executes the AC-magnetization process in the present invention. Therefore, according to the hard disk drive 1B, it is possible to cause the control section 6 to reliably execute the AC-magnetization process in desired timing (during execution of the initialization process in the illustrated example) before a time point (time point of recording of recording data) when it is necessary for the data recording areas At to have been AC-magnetized.

Further, in the hard disk drive 1B, during execution of the AC-magnetization process in the present invention, the control section 6 causes the convex portions 21 to be AC-magnetized in each data recording area At such that the inversion period of the magnetization direction in the direction of rotation of the magnetic disk 10 is fixed in the whole of the area Ae4 AC-magnetized by the AC-magnetization process. Therefore, according to the hard disk drive 1B, compared with the construction in which the convex portions are AC-magnetized such that the inversion period of the magnetization direction is made different depending on portions of the data recording tracks, it is possible to reliably average AC-magnetic components applied to the data recording tracks before recording of recording data, to thereby reliably read only AC-magnetic components applied when recording the recording data, when the recording data is reproduced. As a result, according to the hard disk drive 1B, it is possible to further enhance the quality of a reproducing signal.

Further, in the hard disk drive 1B, during execution of the AC-magnetization process in the present invention, the control section 6 causes a recording area in each data recording area to be AC-magnetized such that the inversion period of the magnetization direction in the direction of rotation of the magnetic disk 10 is different from the inversion period of the magnetization direction in which the convex portions 21 (data recording tracks) are AC-magnetized during recording of recording data, in the area Ae4 AC-magnetized by the AC-magnetization process. Therefore, according to the hard disk drive 1B, unlike the recording and reproducing device which is configured to AC-magnetize the recording area in each data recording area during execution of the AC-magnetization process at the same inversion period as during the recording of recording data, it is possible to prevent AC-magnetic components applied by the AC-magnetization process from being erroneously read as part of the recording data.

Further, in the hard disk drive 1B, during execution of the AC-magnetization process in the present invention, the control section 6 causes convex portions 21 to be AC-magnetized in each data recording area At except for the areas Ae0 (end areas) of the data recording area At toward respective servo pattern areas As adjacent to the data recording area At in the direction of rotation of the magnetic disk 10. Therefore, according to the hard disk drive 1B, it is possible to reliably read servo patterns (servo signals) from the whole of each servo pattern area As without making it difficult to read the servo patterns due to the AC-magnetization of the data recording area-side ends of the respective servo pattern areas As adjacent to the data recording area At.

Next, a magnetic recording medium, a recording and reproducing device, and a method of magnetizing the magnetic recording medium, according to a third embodiment of the present invention will be described mainly with reference to FIGS. 12 and 14. It should be noted that component elements having the same functions as those of the component elements of the above-described magnetic disk 10, the hard disk drives 1A and 1B having the magnetic disk 10 mounted thereon, and magnetizing devices 100 and 200 are designated by identical reference numerals and duplicate description thereof will be omitted.

Similarly to the above-described hard disk drive 1B, a hard disk drive 1C shown in FIG. 12 as the recording and reproducing device according to the third embodiment has the magnetic disk 10 installed therein which has convex portions 21 in all the areas thereof DC-magnetized e.g., by the magnetizing device 100 (i.e., the magnetic disk 10 in the same magnetized state as that of the conventional magnetic disk). Further, unlike the hard disk drive 1B, the storage section 7 of the hard disk drive 1C stores a magnetization process program 32a which executes an AC-magnetization process for AC-magnetizing data recording tracks within a processing range defined in advance for a predetermined data recording track (convex portions 21) on which recording data is recorded, before recording of the recording data on the predetermined data recording track in the data recording area At.

In this hard disk drive 1C, when a command for instructing recording of recording data is issued by the external device, the control section 6 determines whether or not an AC-magnetization process, described hereinafter, has been completed on a total of three data recording tracks (an example of "data recording tracks with a processing range defined in advance" in the present invention), i.e., one data recording track on which the recording data is to be recorded, and two data recording tracks radially adjacent to the data recording track toward the inner and outer peripheries of the magnetic disk 10, respectively. In this case, in the hard disk drive 1C, processed track information 33 enabling identification of data recording tracks having been subjected to the AC-magnetization process (or sectors having been subjected to the AC-magnetization process) are stored in the storage section 7. For example, when recording of the recording data is instructed in a state in which the hard disk drive 1C has not been used (when recording data is initially recorded on the magnetic disk 10), the control section 6 determines based on the processed track information 33 that the AC-magnetization process has not been carried out on three associated data recording tracks.

Then, according to the magnetization process program 32a, the control section 6 starts a process for recording the recording data while AC-magnetizing the above-described three data recording tracks (convex portions 21 in an associated one of the data recording areas At). More specifically, first, the control section 6 outputs the control signal S4 to the controller 2a to thereby cause the magnetic disk 10 to rotate at a constant rotational velocity. Then, the control section 6 outputs the control signal S3 to the driver 5 to thereby move the magnetic head 3 to a position e.g., above the outermost data recording track To (see FIG. 14) of the three data recording tracks described above. At this time, the concave portions 21 of all the areas of the magnetic disk 10 mounted on the hard disk drive 1C have been DC-magnetized, and hence when one of the servo pattern areas As of the magnetic disk 10 passes under the magnetic head 3 in accordance with rotation of the magnetic disk 10, a magnetic signal corresponding to a servo pattern in the servo pattern area As is read by the magnetic head 3, and an output signal (analog signal) corresponding to the servo pattern is outputted. On the other hand, the detecting section 4a detects e.g., a servo address mark based on the output signal from the magnetic head 3.

Further, the control section 6 identifies a time point for starting an AC-magnetization process on a data recording area At including the data recording track, and a time point for terminating the AC-magnetization process, based on the detection signal S1 from the detecting section 4a, the rotational velocity of the magnetic disk 10, the position of the servo address mark area Am identified based on the design data of the magnetic disk 10, and the start position and end position of the AC-magnetization process in the data recording area At. In this case, when the whole of the data recording area At from one end to the other thereof in the direction of rotation of the magnetic disk 10 is AC-magnetized by the magnetic head 3, there is a risk that it becomes difficult to read servo patterns, as described above.

Figure 14:
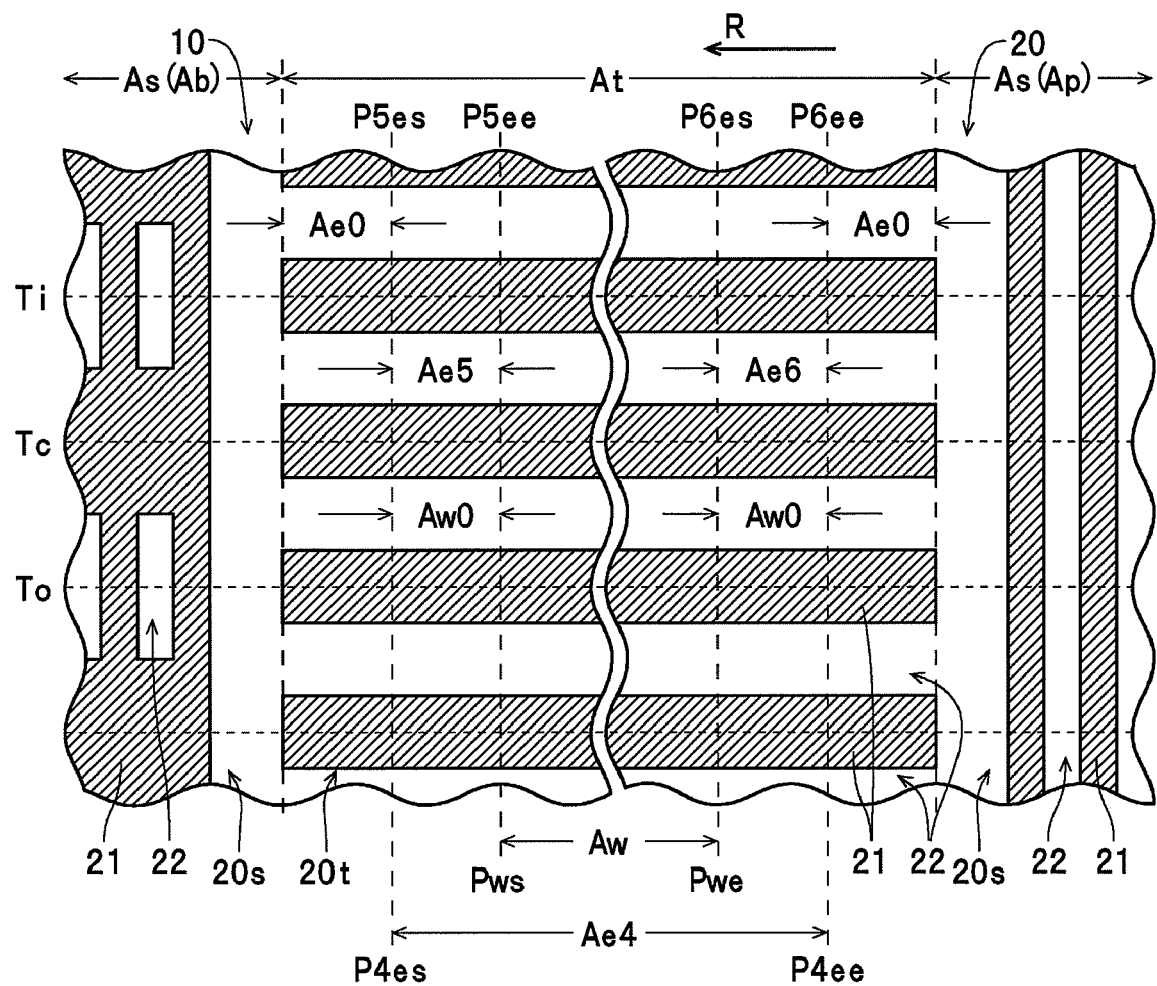
FIG. 14 is another explanatory view useful in explaining a method of magnetizing the magnetic disk by the hard disk drive as the recording and reproducing device according to the third embodiment of the present invention.

Therefore, the magnetization process program 32a stored in the storage section 7 of the hard disk drive 1C is programmed not such that all the convex portions 21 in the whole of the data recording area At are AC-magnetized but such that as shown in FIG. 14, convex portions 21 (magnetic layer 14) in data recording tracks To and Ti, which are adjacent to a data recording track Tc on which the recording data is to be recorded, in the radial direction of the magnetic disk 10, are AC-magnetized in the area Ae4 from the start position P4es to the end position P4ee except for the two areas Ae0 (end area in the present invention) of the data recording area At toward the respective servo pattern areas As adjacent to the data recording area At in the direction of rotation of the magnetic disk 10. Further, the magnetization process program 32a is programmed such that convex portions 21 (magnetic layer 14) in the data recording track Tc for recording the recording data are AC-magnetized in an area Ae5 from a start position P5es to an end position P5ee and an area Ae6 from a start position P6es to an end position P6ee except for the two areas Ae0 (end area in the present invention) of the data recording area At toward the respective servo pattern areas As adjacent to the data recording area At in the direction of rotation of the magnetic disk 10.

More specifically, according to the magnetization process program 32a, the control section 6 outputs the control signal S2 to the power supply section 4b, for causing the power supply section 4b to start supply of the AC voltage V1a to the magnetic head 3, when a time period (hereinafter also referred to as "the first time period") has passed from a time point when the servo address mark area Am is positioned under the magnetic head 3 in accordance with rotation of the magnetic disk 10 (the detection signal S1 is outputted from the detecting section 4a) to a time point when a magnetization process on the data recording track To should be started (when the start position P4es is positioned under the magnetic head 3). Thus, convex portions 21 positioned under the magnetic head 3 (convex portions 21 (magnetic layer 14) forming the data recording track To in the data recording area At, in the illustrated example) are AC-magnetized. It should be noted that the inversion period of the magnetization direction during execution of the AC-magnetization process is the same as the inversion period during execution of the AC-magnetization processes by the magnetizing device 200 and the hard disk drive 1B, and hence detailed description thereof is omitted.

Further, when a time period (hereinafter also referred to as "the second time period") from the time point when the detection signal S1 was outputted from the detecting section 4a to a time point when the magnetization process on the data recording track To has been terminated (the end position P4ee is positioned under the magnetic head 3) has passed, the control section 6 outputs the control signal S2 to the power supply section 4b, for causing the power supply section 4b to stop the supply of the AC voltage V1a to the magnetic head 3. Thus, the data recording track To is AC-magnetized in the area Ae4 from the start position P4es to the end position P4ee. Subsequently, when a range of data recording areas on which the recording data should be recorded extends over plural sectors (when recording data is recorded on plural data recording areas At), similarly to the magnetization of the above-described data recording area At, the control section 6 causes the convex portions 21 (magnetic layer 14) to be AC-magnetized in the area Ae4 between the start position P4es and the end position P4ee in another data recording area At adjacent to the AC-magnetized data recording area At (sector), on the same data recording track To in the direction of rotation of the magnetic disk 10.

Further, when the AC-magnetization process has been completed which AC-magnetizes the data recording track To in a sector radially adjacent to the sector on which the recording data should be recorded, the control section 6 outputs the control signal S3 to the driver 5, and to cause the magnetic head 3 to move to a position above the data recording track Tc (data recording track on which recording data should be recorded) by one track toward the inner periphery of the magnetic disk 10. Then, when a time period has passed from the time point when the detection signal S1 was outputted from the detecting section 4a to the time point when the magnetization process on the data recording track Tc should be started (the start position P5es is positioned under the magnetic head 3), the control section 6 outputs the control signal S2 to the power supply section 4b, to thereby cause the power supply section 4b to start supply of the AC voltage V1a to the magnetic head 3. Further, when a time period has passed from the time point when the detection signal S1 was outputted from the detecting section 4a to the time point when the magnetization process on the data recording track Tc should be terminated (the end position P5ee is positioned under the magnetic head 3), the control section 6 outputs the control signal S2 to the power supply section 4b, to thereby cause the power supply section 4b to stop the supply of the AC voltage V1a to the magnetic head 3. Thus, the data recording track Tc is AC-magnetized in the area Ae5 from the start position P5es to the end position P5ee.

Subsequently, the control section 6 causes magnetic signals corresponding to the recording data to be recorded on the area Aw of the data recording track Tc from the start position Pws to the end position Pwe, according to an instruction command input from the external device. Further, when the recording of the recording data on the data recording track Tc has been completed, the control section 6 outputs the control signal S2 to the power supply section 4b, to thereby cause the power supply section 4b to start the supply of the AC voltage V1a to the magnetic head 3 at the time point when the recording of the recording data has been completed (when the start position P6es, i.e., the end position Pwe is positioned under the magnetic head 3). Further, when a time period has passed from the time point when the detection signal S1 was outputted from the detecting section 4a to the time point when the magnetization process on the data recording track Tc should be terminated (the end position P6ee is positioned under the magnetic head 3), the control section 6 outputs the control signal S2 to the power supply section 4b, to thereby cause the power supply section 4b to stop the supply of the AC voltage V1a to the magnetic head 3. Thus, the data recording track Tc is AC-magnetized in the area Ae6 from the start position P6es (end position Pwe) to the end position P6ee.

Further, when the AC-magnetization process and the data recording process on the data recording track Tc have been completed twice, respectively, the control section 6 outputs the control signal S3 to the driver 5, to thereby cause the magnetic head 3 to move to a position above a data recording track Ti by one track toward the inner periphery of the magnetic device 10. Next, similarly to the AC-magnetization of the above-described data recording track To, the control section 6 causes convex portions 21 (magnetic layer 14) to be AC-magnetized in the area Ae4 from the start position P4es to the end position P4ee on the data recording track Tc. Thus, the recording of the recording data and the AC-magnetization process carried out in accordance with the recording of the recording data are completed. After that, the control section 6 causes the processed track information 33 to be stored in the storage section 7 such that the AC-magnetized data recording tracks can be identified.

In the magnetic disk 10 which has been subjected to the AC-magnetization process and the recording of the recording data as described above, similarly to the magnetic disk 10 having recording data recorded on a predetermined data recording track thereof by the hard disk drive 1B, there exist no DC-magnetized areas around a portion (the area Aw on the data recording track Tc in the illustrated example) having the recording data recorded thereon. On the other hand, when a command for instructing recording of other recording data is input from the external device, the control section 6 determines based on the processed track information 33 stored in the storage section 7 whether or not the AC-magnetization process has been completed on a total of three data recording tracks i.e., one data recording track on which the recording data is to be recorded, and two data recording tracks radially adjacent to the one data recording track toward the inner and outer peripheries of the magnetic disk 10, respectively. At this time, if the control section 6 determines that the AC-magnetization process has not been performed on the three data recording tracks, the control section 6 carries out the AC-magnetization process and the recording of the recording data by the same procedure as employed in the above-described AC-magnetization process.

More specifically, if the control section 6 determines that the AC-magnetization process on the two data recording tracks adjacent to the data recording track on which the recording data is to be recorded has not been completed, similarly to the AC-magnetization of the above-described data recording tracks To and Ti, the control section 6 causes convex portions 21 (magnetic layer 14) to be AC-magnetized in the area Ae4 from the start position P4es to the end position P4ee on each of the adjacent data recording tracks. Further, if the control section 6 determines that the AC-magnetization process on the data recording track on which the recording data is to be recorded has not been completed, similarly to the AC-magnetization of the above-described data recording track Tc and the recording of the recording data on the data recording track Tc, the control section 6 causes convex portion 21 (magnetic layer 14) to be AC-magnetized in the area Ae5 from the start position P5es to the end position P5ee of the data recording track on which the recording data is to be recorded, and then starts the recording of the recording data from the start position Pws (end position P5ee). When the recording of the recording data has been completed to the end position Pwe, the control section 6 causes convex portions 21 (magnetic layer 14) to be AC-magnetized in the area Ae6 from the end position Pwe (start position P6es) to the end position P6ee of the data recording track. On the other hand, if the control section 6 determines that the AC-magnetization process has been carried out on the three data recording tracks, the control section 6 immediately executes the recording of the recording data on a desired data recording track without carrying out the AC-magnetization process.

It should be noted that although in the hard disk drive 1C, when the data recording track Tc for recording the recording data is to be AC-magnetized, the method is employed in which the recording data is recorded on the area Aw after AC-magnetization of the convex portions 21 in the area Ae5, and then the convex portions 21 (magnetic layer 14) in the area Ae6 are AC-magnetized, this is not limitative. For example, to AC-magnetize the data recording track Tc and the data recording tracks To and Ti adjacent to the data recording track Tc, it is possible to employ a construction in which the convex portion 21 (magnetic layer 14) in the area Ae4 from the start position P4es to the end position P4ee on each of the data recording tracks Tc, To and Ti is AC-magnetized before recording of the recording data, and then the recording data is recorded on the area Aw of the data recording track Tc. In this construction as well, similarly to the magnetic disk 10 having recording data recorded on a predetermined data recording track thereof by the above-described hard disk drive 1C, there exist no DC-magnetized areas around a portion (the area Aw on the data recording track Tc in the illustrated example) having the recording data recorded thereon.

As described above, in the hard disk drive 1C, the control section 6 executes the AC-magnetization process for AC-magnetizing data recording tracks (the data recording track Tc and the data recording track To and Ti in the illustrated example) within a processing range predefined for the data recording track Tc in the data recording area At, before recording of recording data on the data recording track Tc. Therefore, according to the hard disk drive 1C, unlike the recording and reproducing device configured to record recording data on DC-magnetized data recording tracks, it is possible to read only AC-magnetic components applied when recording the recording data during reproducing of the recording data without reading a magnetic signal in a state in which DC-magnetic components are superimposed on the AC-magnetic components applied when recording the recording data, thereby making it possible to sufficiently enhance the quality of a reproducing signal. As a result, according to the hard disk drive 1C, it is possible to read the recording data with high accuracy. Further, unlike the recording and reproducing device configured to AC-magnetize e.g., all the data recording areas At on the magnetic disk 10 immediately before recording of recording data, it is possible to AC-magnetize only portions which can be adversely affected by DC-magnetic components during reproducing of the recording data in a short time period, which makes it possible to start recording of the recording data on the magnetic disk 10 in a short time.

Further, in the hard disk drive 1C, the control section 6 causes the storage section 7 to store processed track information 33 enabling identification of data recording tracks having been subjected to the AC-magnetization process (or sectors having been subjected to the AC-magnetization process). When the control section 6 determines based on the processed track information 33 that any of data recording tracks within a processing range defined in advance is unprocessed, the control section 6 carries out the above-described AC-magnetization process on the unprocessed data recording tracks. Therefore, according to the hard disk drive 1C, the AC-magnetization process is prevented from being performed repeatedly on AC-magnetized data recording tracks, whereby it is possible to start recording of recording data on the magnetic disk 10 in a shorter time period.

It should be noted that the present invention is by no means limited to the aforementioned constructions and methods. For example, although the description has been given of the example in which the AC-magnetization process is carried out according to an instruction command e.g., from a personal computer having the hard disk drive 1B connected thereto, this is not limitative, but it is possible to employ a method in which a manufacturer connects the hard disk drive 1B to a dedicated operation instructing device (another example of the external device in the present invention), and causes the hard disk drive 1B to execute the AC-magnetization process before shipping the hard disk drive 1B. Further, although the description has been given of the hard disk drive 1C configured such that when recording data is to be recorded, the AC-magnetization process is carried out on the three data recording tracks, i.e., the data recording track Tc on which the recording data is to be recorded, and the two data recording tracks To and Ti adjacent to the data recording track Tc, this is not limitative, but it is also possible to employ a construction in which the AC-magnetization process is carried out only on the data recording track Tc on which recording data is to be recorded, before recording of the recording data on the data recording track Tc, or a construction in which the AC-magnetization process is carried out not on the data recording track Tc on which recording data is to be recorded, but only on one or plural data recording tracks (data recording tracks To, Ti, etc.) adjacent to the data recording track Tc.

Further, although the description has been given of the magnetic disk 10 in which the whole of each convex portion 21 of the concave/convex pattern 20 (the data track pattern 20t and the servo pattern 20s), from a protruding end to a root portion thereof, is formed by the magnetic layer 14 (magnetic material), by way of example, the construction of the magnetic recording medium according to the present invention is not limited to this. More specifically, for example, it is possible to form the data track pattern 20t and the servo pattern 20s by a concave/convex pattern 20 which has convex portions 21 each having a protruding end formed by the magnetic layer 14 and a root portion formed by an intermediate layer 13 or a soft magnetic layer 12, and concave portions 22 each having a bottom surface formed in the thickness of the intermediate layer 13 or the soft magnetic layer 12.

Figure 15:
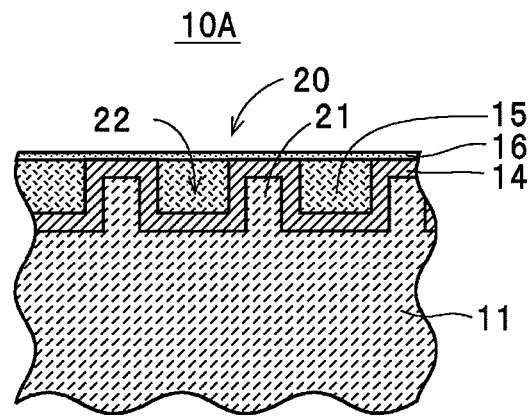
FIG. 15 is a cross-sectional view of a magnetic disk as a magnetic recording medium according to a fourth embodiment of the present invention.
Figure 16:
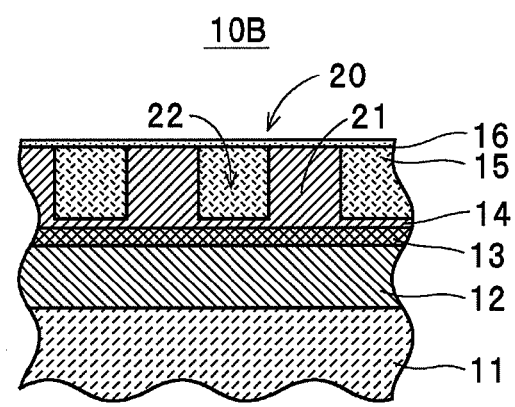
FIG. 16 is a cross-sectional view of a magnetic disk as a magnetic recording medium according to a fifth embodiment of the present invention.

Further, as in a magnetic disk 10A as a magnetic recording medium shown in FIG. 15 according to a fourth embodiment of the present invention, by forming the magnetic layer 14 in a manner covering a concave/convex pattern (concave/convex pattern similar to the concave/convex pattern 20 in the concave-convex positional relationship) formed on the glass base plate 11, it is possible to form the concave/convex pattern 20 (the data track pattern 20t and the servo pattern 20s), which has plural convex portions 21 surfaces of which are formed of a magnetic material, and plural concave portions 22 bottoms of which are formed of the magnetic material. Furthermore, as in a magnetic disk 10B as a magnetic recording medium shown in FIG. 16 according to a fifth embodiment of the present invention, the concave/convex pattern 20 can be formed by forming not only each convex portion 21 but also the bottom of each concave portion 22 by the magnetic layer 14.

Figure 17:
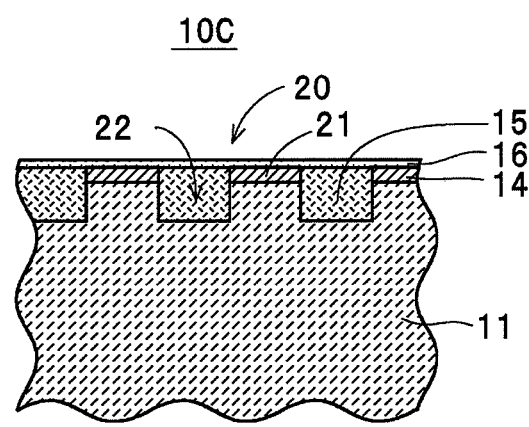
FIG. 17 is a cross-sectional view of a magnetic disk as a magnetic recording medium according to a sixth embodiment of the present invention.

Further, as in a magnetic disk 10C as a magnetic recording medium shown in FIG. 17 according to a sixth embodiment of the present invention, it is also possible to form the concave/convex pattern 20 which has plural convex portions 21 only protruding ends of which are formed by the magnetic layer 14, and root portions of which are formed of a non-magnetic material or a soft magnetic material (glass base plate 11 in the illustrated example). In this case, although in the magnetic disk 10C shown in FIG. 17, only the protruding ends of the convex portions 21 are formed by the magnetic layer 14, it is also possible to employ a construction in which the magnetic layer 14 is formed on the bottom surfaces of the concave portions 22 between the convex portions 21 and 21 adjacent to each other (a construction in which the magnetic layer 14 does not exist on the side surfaces of the convex portions 21 of the above-described magnetic disk 10A: not shown).

Further, it is possible to form a magnetic disk (not shown) by filling the magnetic material, which forms the above-described magnetic layer 14, in each concave portion formed in a layer made of the non-magnetic material to thereby define a convex portion in the layer made of the non-magnetic material as a non-recording area (area corresponding to each concave portion 22 e.g., of the magnetic disk 10) and a portion of the magnetic material filled in the concave portion as a recording area (area corresponding to each convex portion 21 e.g., of the magnetic disk 10). Further, it is also possible to form a magnetic disk (not shown) by selectively changing in properties desired areas on the layer made of the magnetic material to form areas having a lower capability of readably holding a magnetic signal than those of areas therearound, or areas configured not to substantially have such a capability, to thereby define areas having a higher capability of readably holding a magnetic signal as recording areas (areas corresponding to the convex portions 21 e.g., of the magnetic disk 10), and areas having a lower capability of readably holding a magnetic signal as non-recording areas (areas corresponding to the concave portions 22 e.g., of the magnetic disk 10).

In addition, although the description has been given of the example in which both the data track pattern 20t and the servo pattern 20s are formed by the concave/convex pattern 20 having the convex portions 21 and the concave portions 22, this is not limitative, but the magnetic recording medium according to the present invention can be configured such that it can record and reproduce recording data by forming the servo pattern 20s in the servo pattern areas As by the concave/convex pattern 20, and forming a continuous magnetic film (smooth magnetic layer 14 with no asperities) in each data recording areas At.

What is claimed is:

1. A rotary-type magnetic recording medium that has a servo pattern formed in a servo pattern area on at least one surface of a disk-shaped substrate by a pattern having a recording area and a non-recording area, and a data track pattern formed in a data recording area on the at least one surface of the disk-shaped substrate by the pattern, wherein in a state in which recording data is not recorded in the data recording area, the recording area in the servo pattern area is DC-magnetized, while the recording area in the data recording area is AC-magnetized; and wherein the recording area of the data recording area is AC-magnetized except for an end area thereof toward the servo pattern area in the direction of rotation of the magnetic recording medium.

2. A rotary-type magnetic recording medium that has a servo pattern formed in a servo pattern area on at least one surface of a disk-shaped substrate by a pattern having a recording area and a non-recording area, and a data track pattern formed in a data recording area on the at least one surface of the disk-shaped substrate by the pattern, wherein in a state in which the magnetic recording medium is not mounted in a recording and reproducing device, the recording area in the servo pattern area is DC-magnetized, while the recording area in the data recording area is AC-magnetized; and wherein the recording area of the data recording area is AC-magnetized except for an end area thereof toward the servo pattern area in the direction of rotation of the magnetic recording medium.

3. A rotary-type magnetic recording medium that has a servo pattern formed in a servo pattern area on at least one surface of a disk-shaped substrate by a pattern having a recording area and a non-recording area, and a data track pattern formed in a data recording area on the at least one surface of the disk-shaped substrate by the pattern, wherein the recording area in the servo pattern area is DC-magnetized, while the recording area in the data recording area is AC-magnetized, and at the same time an inversion period of a magnetization direction in a direction of rotation of the magnetic recording medium is fixed in a whole AC-magnetized area in the data recording area.

4. A magnetic recording medium according to claim 3, wherein the recording area of the data recording area is AC-magnetized except for an end area thereof toward the servo pattern area in the direction of rotation of the magnetic recording medium.

5. A recording and reproducing device comprising:

a magnetic recording medium according to claim 3;

a magnetic head for recording a magnetic signal on the magnetic recording medium and reading the magnetic signal from the magnetic recording medium; and a control section for controlling recording and reading of the magnetic signal by the magnetic head.

6. A rotary-type magnetic recording medium that has a servo pattern formed in a servo pattern area on at least one surface of a disk-shaped substrate by a pattern having a recording area and a non-recording area, and a data track pattern formed in a data recording area on the at least one surface of the disk-shaped substrate by the pattern, wherein the recording area in the servo pattern area is DC-magnetized, while the recording area in the data recording area is AC-magnetized, and at the same time an inversion period of a magnetization direction in a direction of rotation of the magnetic recording medium in an AC-magnetized area in the data recording area is different from an inversion period of a magnetization direction in which the recording area is AC-magnetized during recording of recording data in the data recording area.

7. A magnetic recording medium according to claim 6, wherein the recording area of the data recording area is AC-magnetized except for an end area thereof toward the servo pattern area in the direction of rotation of the magnetic recording medium.

8. A recording and reproducing device comprising:

a magnetic recording medium according to claim 6;

a magnetic head for recording a magnetic signal on the magnetic recording medium and reading the magnetic signal from the magnetic recording medium; and a control section for controlling recording and reading of the magnetic signal by the magnetic head.

9. A recording and reproducing device comprising:

a rotary-type magnetic recording medium that has a servo pattern formed in a servo pattern area on at least one surface of a disk-shaped substrate by a pattern having a recording area and a non-recording area, and a data track pattern formed in a data recording area on the at least one surface of the disk-shaped substrate by the pattern, wherein the recording area in the servo pattern area on the at least one surface of the disk-shaped substrate is DC-magnetized;

a magnetic head for recording a magnetic signal on the magnetic recording medium and reading the magnetic signal from the magnetic recording medium; and a control section for controlling recording and reading of the magnetic signal by the magnetic head, wherein the control section carries out either one of an AC-magnetization process for AC-magnetizing the recording area in the data recording area via the magnetic head at a predetermined time point before recording of recording data in the data recording area, and an AC-magnetization process for AC-magnetizing, via the magnetic head, a predetermined data recording track formed by the recording area in the data recording area within a processing range which is defined for the data recording track in advance, before recording the recording data on the predetermined data recording track.

10. A recording and reproducing device according to claim 9, wherein the control section carries out the AC-magnetization process by setting a time point when an instruction command is outputted from an external device as the predetermined time point.

11. A recording and reproducing device according to claim 9, wherein the control section causes the recording area to be AC-magnetized in the data recording area such that an inversion period of a magnetization direction in a direction of rotation of the magnetic recording medium is fixed in a whole area AC-magnetized by the AC-magnetization process.

12. A recording and reproducing device according to claim 9, wherein the control section causes the recording area to be AC-magnetized in the data recording area such that an inversion period of a magnetization direction in a direction of rotation of the magnetic recording medium in the area AC-magnetized by the AC-magnetization process is made different from an inversion period of a magnetization direction in which the recording area is AC-magnetized during recording of the recording data.

13. A recording and reproducing device according to claim 9, wherein the control section causes the recording area to be AC-magnetized in the data recording area except for an end area of the recording area toward the servo pattern area in the direction of rotation of the magnetic recording medium during execution of the AC-magnetization process.

14. A magnetic recording medium-magnetizing device for magnetizing a rotary-type magnetic recording medium, comprising:

a rotating mechanism for rotating the rotary-type magnetic recording medium that has a servo pattern formed in a servo pattern area on at least one surface of a disk-shaped substrate by a pattern having a recording area and a non-recording area, and a data track pattern formed in a data recording area on the at least one surface of the disk-shaped substrate by the pattern, wherein the recording area in the servo pattern area on the at least one surface of the disk-shaped substrate is DC-magnetized;

a magnetic head for magnetizing the recording area;

a power supply section for supplying an AC voltage to the magnetic head; and a control section for controlling the rotating mechanism and the power supply section, wherein while controlling the rotating mechanism such that the magnetic recording medium is rotated, the control section controls and causes the power supply section to supply the AC voltage to the magnetic head when the magnetic head is positioned above the data recording area, the control section causes the power supply section to thereby AC-magnetize the recording area in the data recording area.

15. A magnetic recording medium-magnetizing device for magnetizing a rotary-type magnetic recording medium, comprising:

a rotating mechanism for rotating the rotary-type magnetic recording medium that has a servo pattern formed in a servo pattern area on at least one surface of a disk-shaped substrate by a pattern having a recording area and a non-recording area, and a data track pattern formed in a data recording area on the at least one surface of the disk-shaped substrate by the pattern;

a magnetic head for magnetizing the recording area;

a power supply section for supplying a DC voltage or an AC voltage to the magnetic head; and a control section for controlling the rotating mechanism and the power supply section, wherein while controlling the rotating mechanism such that the magnetic recording medium is rotated, the control section controls and causes the power supply section to supply the DC voltage to the magnetic head when the magnetic head is positioned above the servo pattern area to thereby DC-magnetize the recording area in the servo pattern area, and when the magnetic head is positioned above the data recording area, the control section controls and causes the power supply section to supply the AC voltage to the magnetic head to thereby AC-magnetize the recording area in the data recording area.

* * * * *